US009898128B2

United States Patent
Oda

(10) Patent No.: US 9,898,128 B2
(45) Date of Patent: Feb. 20, 2018

(54) SENSOR SIGNAL PROCESSING CIRCUIT AND SENSOR SIGNAL PROCESSING METHOD

(71) Applicant: Wacom Co., Ltd., Saitama (JP)

(72) Inventor: Yasuo Oda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 64 days.

(21) Appl. No.: 14/841,342

(22) Filed: Aug. 31, 2015

(65) Prior Publication Data

US 2016/0077655 A1    Mar. 17, 2016

(30) Foreign Application Priority Data

Sep. 17, 2014    (JP) ................................. 2014-188440

(51) Int. Cl.
*G06F 3/045*    (2006.01)
*G06F 3/041*    (2006.01)
*G06F 3/044*    (2006.01)

(52) U.S. Cl.
CPC ............ *G06F 3/0416* (2013.01); *G06F 3/044* (2013.01); *G06F 2203/04101* (2013.01); *G06F 2203/04106* (2013.01)

(58) Field of Classification Search
CPC .................... G06F 3/0416; G06F 3/044; G06F 2203/04106; G06F 2203/04101
USPC ......................................................... 345/174
See application file for complete search history.

(56) References Cited

U.S. PATENT DOCUMENTS

| 8,487,891 | B2 | 7/2013 | Oda et al. |
| 8,581,861 | B2 | 11/2013 | Oda et al. |
| 8,587,534 | B2 | 11/2013 | Oda et al. |
| 8,587,535 | B2 | 11/2013 | Oda et al. |
| 8,692,779 | B2 | 4/2014 | Oda et al. |
| 8,896,547 | B2 | 11/2014 | Oda et al. |
| 8,913,041 | B2 | 12/2014 | Fukushima et al. |
| 2008/0218489 | A1* | 9/2008 | Park ...................... G06F 3/0416 345/173 |

(Continued)

FOREIGN PATENT DOCUMENTS

| JP | 2011-003035 A | 1/2011 |
| JP | 2011-003036 A | 1/2011 |

(Continued)

*Primary Examiner* — Srilakshmi K Kumar
*Assistant Examiner* — Chineyere Wills-Burns
(74) *Attorney, Agent, or Firm* — Seed Intellectual Property Law Group LLP

(57) ABSTRACT

A sensor signal processing circuit is connected to a sensor including first and second conductors arranged in different directions. The sensor signal processing circuit includes: a signal supply circuit configured to supply a first signal to the first conductor; a first signal detecting circuit connected to the second conductor; and a control circuit configured to perform control of detecting a proximity of an indicator to the sensor based on a change in a capacitance between the second conductor and a ground, and detecting a position indicated by the indicator based on a change in a capacitance at an intersection point of the first and second conductors by controlling the signal supply circuit and the first signal detecting circuit based on a comparison between a predetermined value and a detection result based on the change in the capacitance between the second conductor and the ground.

19 Claims, 10 Drawing Sheets

(56) References Cited

U.S. PATENT DOCUMENTS

| | | | |
|---|---|---|---|
| 2009/0153152 A1* | 6/2009 | Maharyta | G06F 3/044 |
| | | | 324/684 |
| 2010/0321313 A1 | 12/2010 | Oda et al. | |
| 2010/0321314 A1 | 12/2010 | Oda et al. | |
| 2010/0321315 A1 | 12/2010 | Oda et al. | |
| 2010/0321331 A1 | 12/2010 | Oda et al. | |
| 2010/0321332 A1 | 12/2010 | Oda et al. | |
| 2010/0321333 A1 | 12/2010 | Oda et al. | |
| 2010/0321334 A1 | 12/2010 | Oda et al. | |
| 2011/0219892 A1 | 9/2011 | Fukushima et al. | |
| 2012/0105362 A1* | 5/2012 | Kremin | G06F 3/03545 |
| | | | 345/174 |
| 2012/0146940 A1 | 6/2012 | Yamamoto et al. | |
| 2013/0241866 A1* | 9/2013 | Wang | G06F 3/045 |
| | | | 345/174 |
| 2014/0062898 A1* | 3/2014 | Singh | G06F 1/3262 |
| | | | 345/173 |
| 2014/0320445 A1* | 10/2014 | Kim | G06F 3/03545 |
| | | | 345/174 |

FOREIGN PATENT DOCUMENTS

| | | |
|---|---|---|
| JP | 2011-186803 A | 9/2011 |
| JP | 2011-243081 A | 12/2011 |
| JP | 2012-123599 A | 6/2012 |

\* cited by examiner

SENSOR SIGNAL PROCESSING CIRCUIT AND SENSOR SIGNAL PROCESSING METHOD

BACKGROUND OF THE INVENTION

1. Field of the Invention

The present disclosure relates to a sensor signal processing circuit connected to a capacitance type sensor, and a sensor signal processing method.

2. Description of the Related Art

Position detecting devices such as touch panels have come into wide use, and various inventions related to the position detecting devices have been made. For example, Patent Document 1 (Japanese Patent Laid-Open No. 2011-243081) discloses an invention related to a capacitance type position detecting device. The position detecting device disclosed in Patent Document 1 includes a sensor having a plurality of first conductors arranged in a first direction and a plurality of second conductors arranged in a direction different from the first direction, for example a second direction orthogonal to the first direction, and includes a sensor signal processing circuit connected to the sensor.

The sensor signal processing circuit of the position detecting device in this Patent Document 1 supplies a predetermined signal to the first conductors (transmitting conductors) of the sensor to detect a position indicated by an indicator. At the position indicated by a finger as the indicator on the sensor, a current (charge) corresponding to the predetermined signal is shunted via the finger, and thereby a capacitance (mutual capacitance) formed between a first conductor (transmitting conductor) and a second conductor (receiving conductor) changes. The sensor signal processing circuit can detect the position indicated by the finger as the indicator by detecting a change in the signal in the receiving conductor based on the change in the capacitance (mutual capacitance).

Incidentally, a position indicated by a position indicator (capacitance type pen-shaped position indicator (passive capacitive pen)) rather than a finger which position indicator a user holds with a hand to indicate the position on a sensor can also be detected by detecting a change in a signal in a receiving conductor based on a change in capacitance (mutual capacitance) on similar principles.

In addition, a position indicator referred to as an active capacitive pen is also known as an indicator. Known types of this active capacitive pen include a type of active capacitive pen that includes a driving power supply and an oscillator driven by the driving power supply within a casing of the active capacitive pen and which supplies an oscillating signal of the oscillator to the position detecting device, or a type of active capacitive pen that receives a signal from the position detecting device, amplifies the signal, and supplies the signal to the position detecting device. The position detecting device receiving the signal sent out from this type of position indicator detects a position indicated by the active capacitive pen by receiving the signal from the active capacitive pen by each of a first conductor in the first direction and a second conductor in the second direction of the sensor on the basis of capacitive coupling.

The conventional position detecting device detects a position indicated by the finger as an indicator, the passive capacitive pen, or another indicator by detecting a change in mutual capacitance in regions (cross point regions) formed between the plurality of first conductors arranged in the first direction and the plurality of second conductors arranged in the second direction. The detection of the position indicated by the indicator is performed in the conventional position detecting device irrespective of whether the finger or the passive capacitive pen is present at a position in proximity to the sensor such that the position indication may be performed on the sensor. That is, even when the indicator is in a state of being slightly distant from the sensor, or in a so-called hovering state, the hovering position of the indicator is detected by detecting a change in mutual capacitance.

However, the constitution that detects a position indicated by the indicator by detecting a change in mutual capacitance in the regions (cross point regions) formed between the plurality of first conductors arranged in the first direction and the plurality of second conductors arranged in the second direction has low detection sensitivity, and cannot necessarily be said to be most suitable in terms of detection sensitivity in a direction of height from the surface of the sensor in detecting the position indicated by the indicator in a hovering state.

SUMMARY OF THE INVENTION

In view of the above problems, it is an object of the present disclosure to provide a sensor signal processing circuit and a sensor signal processing method that can detect an indicator such as a finger or a passive capacitive pen with high sensitivity and with high efficiency even when the indicator is in a hovering state.

In order to solve the above problems, according to a first embodiment of the disclosure, there is provided a sensor signal processing circuit connected to a sensor, the sensor including a first conductor disposed in a first direction and a second conductor disposed in a second direction different from the first direction. The sensor signal processing circuit includes: a signal supply circuit configured to supply a first signal to the first conductor; a first signal detecting circuit connected to the second conductor; and a control circuit configured to perform control of detecting proximity of an indicator to the sensor on a basis of a change in a capacitance between a conductor constituting the second conductor and a ground by controlling the first signal detecting circuit, and perform control of detecting a position indicated by the indicator on the sensor on a basis of a change in a capacitance at a point of intersection formed by the second conductor and the first conductor supplied with the first signal from the signal supply circuit by controlling the signal supply circuit and the first signal detecting circuit on a basis of a result of comparing, with a predetermined value, a detection result based on the change in the capacitance between the conductor constituting the second conductor and the ground, the detection result being output from the first signal detecting circuit.

According to the present disclosure, the control circuit detects the proximity of the indicator to the sensor on the basis of the change in the capacitance between the conductor constituting the second conductor and the grounding node by controlling the first signal detecting circuit. Here, the ground refers to grounding by connection to an earth or an earth conductor of a printed board, wherein the earth conductor provides a common reference potential and is not necessarily connected to the earth, and the capacitance between the conductor and the ground refers to a self-capacitance. Then, the control circuit performs control of detecting the change in the capacitance at the point of intersection formed by the second conductor and the first conductor supplied with the first signal from the signal supply circuit, and detecting the position indicated by the indicator on the sensor on the basis of the detected change in the capacitance, by controlling the signal supply circuit and the first signal detecting circuit on the basis of the result of comparing, with the predetermined value, the detection result based on the change in the capacitance between the conductor constituting the second conductor and the ground, the detection result being output from the first signal detecting circuit.

According to the present disclosure, the proximity of the indicator in a hovering state to the sensor is detected on the basis of a change in the capacitance between the conductor constituting the second conductor and the ground. Thus, the proximity of the indicator can be detected with higher sensitivity than in the case where the proximity is detected by using the capacitance (mutual capacitance) at the point of intersection of the first conductor and the second conductor.

In addition, the proximity of the indicator in a hovering state is detected in units of second conductors. Thus, a power saving can be achieved in the detection processing as compared with a case where the proximity is detected by using capacitances (mutual capacitances) at all of points of intersection between first conductors and second conductors.

Then, when the indicator is in proximity to the sensor, the first signal is supplied from the signal supply circuit to a plurality of first conductors, and control is performed to detect a change in capacitance (mutual capacitance) at points of intersection formed by the plurality of first conductors supplied with the first signal from the signal supply circuit and a plurality of second conductors, and detect a position indicated by the indicator on the sensor on the basis of a position of intersection of conductors at which position the above-described detected change in capacitance occurs on the sensor. Thus, the indicator can be detected efficiently.

DETAILED DESCRIPTION OF PREFERRED EMBODIMENTS

Embodiments of a sensor signal processing circuit and a sensor signal processing method according to the present disclosure will hereinafter be described with reference to the drawings.

[First Embodiment]

[An Electronic Apparatus and a Position Detecting Device to which the Sensor Signal Processing Circuit and the Sensor Signal Processing Method According to the Present Disclosure are Applied]

Figure 1:
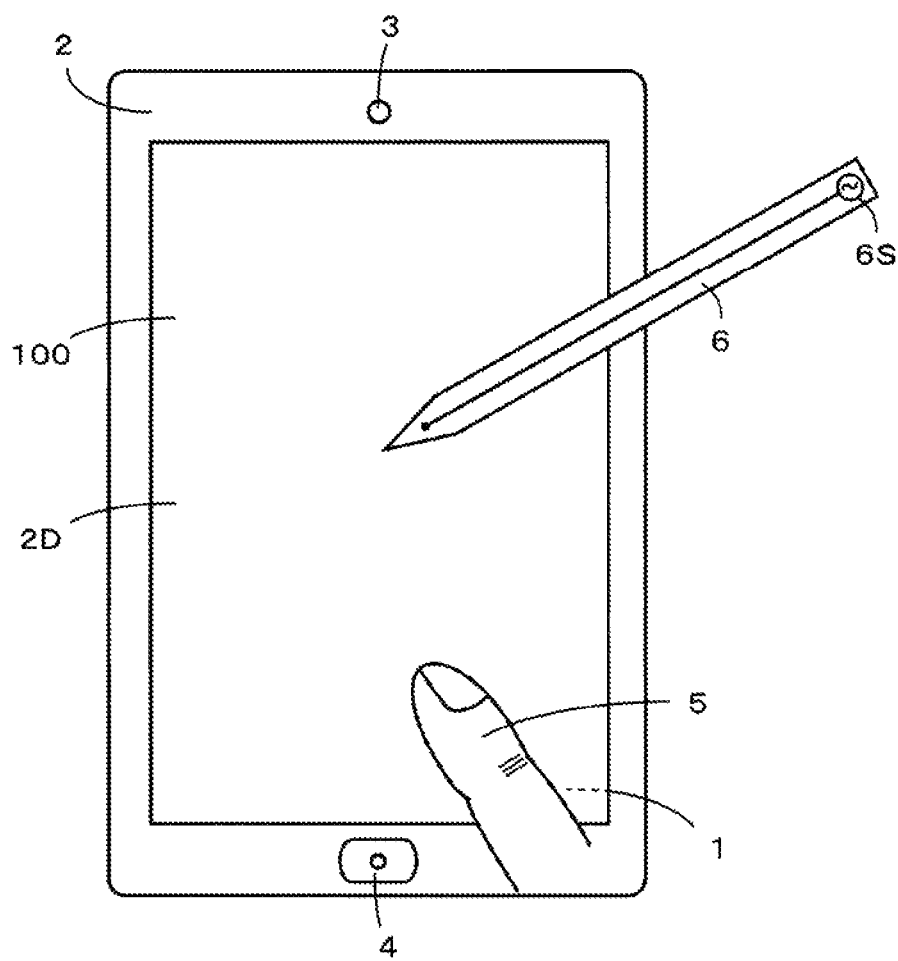
FIG. 1 is a diagram of assistance in explaining an example of an electronic apparatus to which an embodiment of a sensor signal processing circuit according to the present disclosure is applied.

FIG. 1 shows an example of an electronic apparatus including a position detecting device 1 configured by applying thereto one embodiment of the sensor signal processing circuit and the sensor signal processing method according to the present disclosure. The electronic apparatus 2 in the example shown in FIG. 1 is for example a portable apparatus referred to as a smart phone or the like which apparatus has a display screen 2D of a display device such as a liquid crystal display (LCD). A sensor (position detecting sensor) 100 forming the position detecting device 1 is disposed on a front surface portion of the display screen 2D. In addition, a telephone receiver 3 and a telephone transmitter 4 are respectively provided at an upper portion and a lower portion of the electronic apparatus 2.

When an indicator performs a position indicating operation on the sensor 100 disposed on the front surface portion of the display screen 2D of the electronic apparatus 2, the position detecting device 1 can detect the position indicated by the indicator, and a microcomputer included in the electronic apparatus 2 can perform display processing according to the operation position. In the example to be described in the following, description will be made of a case where a finger 5 is used as the indicator. In addition, in the electronic apparatus 2 according to the present embodiment, the position detecting device 1 is configured to be able to detect not only a position indicating operation (finger touch) by the finger 5 on the sensor 100 but also a pen indicating operation by an active capacitive pen 6 that sends out a transmission signal. The active capacitive pen 6 has an electrode at a predetermined position on a pen point side of a casing of the active capacitive pen 6. The active capacitive pen 6 is an example of a stylus.

[An Example of Configuration of the Capacitance Type Position Detecting Device 1]

Figure 2:
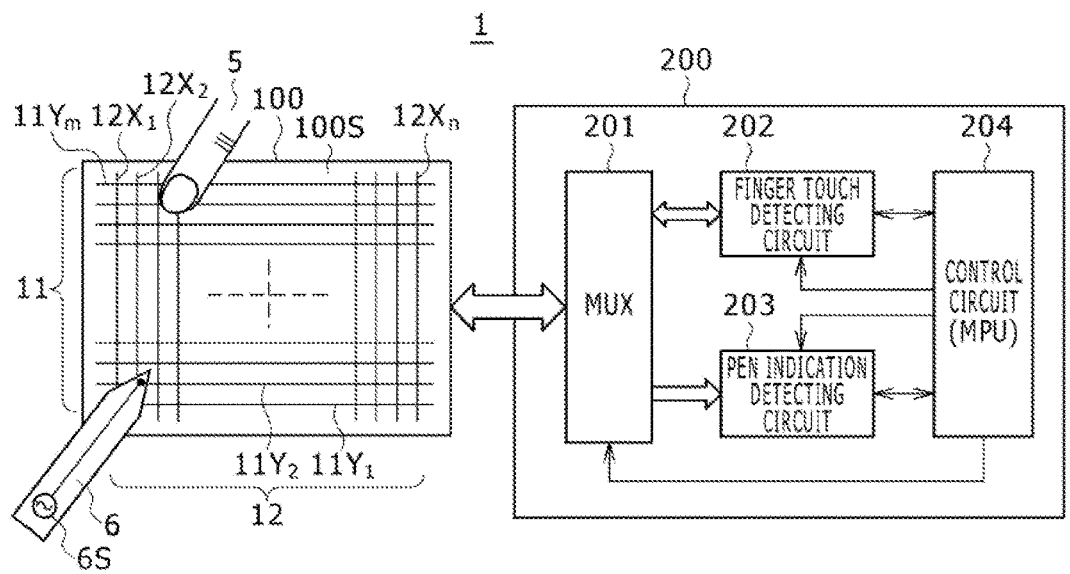
FIG. 2 is a block diagram of assistance in explaining outlines of an example of configuration of a position detecting device to which a first embodiment of the sensor signal processing circuit according to the present disclosure is applied.

Description will next be made of an example of configuration of the position detecting device 1 used in the electronic apparatus 2 shown in FIG. 1 or the like. FIG. 2 is a diagram of assistance in explaining an example of general configuration of the position detecting device 1 according to the present embodiment. The position detecting device 1 in the present example includes the sensor 100 of a so-called cross point configuration. The position detecting device 1 is configured to supply a transmission signal to a plurality of first conductors arranged in a first direction, and receive the signal from a plurality of second conductors arranged in a second direction different from the first direction when the position detecting device 1 detects an capacitive touch by the indicator such as the finger 5, or particularly multi-touch. In addition, the position detecting device 1 is configured to receive a signal from each of the first conductors and the second conductors arranged in the first direction and the second direction in the case where the indicator is the active capacitive pen 6. Incidentally, principles and the like of the capacitance type position detecting device of the cross point configuration are described in detail in Japanese Patent Laid-Open No. 2011-3035, Japanese Patent Laid-Open No. 2011-3036, and Japanese Patent Laid-Open No. 2012-123599, which are laid-open publications of applications related to inventions by the inventor of the present application.

As shown in FIG. 2, the position detecting device 1 according to the present embodiment includes the sensor 100 constituting a touch panel (position detecting sensor) and a sensor signal processing circuit 200 connected to the sensor 100. The sensor signal processing circuit 200 includes a multiplexer 201 as an input-output interface with the sensor 100, a finger touch detecting circuit 202, a pen indication detecting circuit 203, and a control circuit 204.

The sensor 100 in the present example is formed by stacking a first conductor group 11, an insulating layer (not shown), and a second conductor group 12 in order from a lower layer side. The first conductor group 11 includes for example first conductors $11Y_1$, $11Y_2$, ..., and $11Y_m$ (m is an integer of one or more) extending in a horizontal direction (X-axis direction), the first conductors $11Y_1$, $11Y_2$, ..., and $11Y_m$ being arranged in parallel with each other in a Y-axis direction with predetermined intervals therebetween.

In addition, the second conductor group 12 includes second conductors $12X_1$, $12X_2$, ..., and $12X_n$ (n is an integer of one or more) extending in a direction intersecting the extending direction of the first conductors $11Y_1$, $11Y_2$, ..., and $11Y_m$, or a vertical direction (Y-axis direction) orthogonal to the extending direction of the first conductors $11Y_1$, $11Y_2$, ..., and $11Y_m$ in the present example, the second conductors $12X_1$, $12X_2$, ..., and $12X_n$ being arranged in parallel with each other in the X-axis direction with predetermined intervals therebetween. It is to be noted that the first conductor group 11 and the second conductor group 12 in the example to be described in the following are constituted of the plurality of first conductors $11Y_1$, $11Y_2$, ..., and $11Y_m$ and the plurality of second conductors $12X_1$, $12X_2$, ..., and $12X_n$, respectively.

Thus, the position detecting device 1 is configured to detect a position indicated by the indicator such as the finger 5 or the active capacitive pen 6 using a sensor pattern formed by making the first conductor group 11 and the second conductor group 12 intersect each other. In the present embodiment, the position detecting device 1 determines whether or not the finger 5 as an example of the indicator is in proximity to the sensor 100. When the position detecting device 1 recognizes that the finger 5 is in proximity to the sensor 100, the position detecting device 1 detects a position indicated by the finger 5 on the sensor 100.

Incidentally, in the following description, when each of the first conductors $11Y_1$, $11Y_2$, ..., and $11Y_m$ does not need to be distinguished from the other, the conductor will be referred to as a first conductor 11Y. Similarly, when each of the second conductors $12X_1$, $12X_2$, ..., and $12X_n$ does not need to be distinguished from the other, the conductor will be referred to as a second conductor 12X.

The position detecting device 1 according to the present embodiment is used in a state of being included in the electronic apparatus 2 such as a portable apparatus referred to as a smart phone as described above with reference to FIG. 1. Therefore, the sensor 100 has a sensor surface (indication input surface) 100S that corresponds to the size of the display screen 2D of the display device included in the electronic apparatus 2 and which has a screen size of about four inches, for example, and is formed by the first conductor group 11 and the second conductor group 12 having light transparency.

Incidentally, both of the first conductor group 11 and the second conductor group 12 may be arranged on a same surface side of a sensor substrate. Alternatively, the first conductor group 11 may be arranged on one surface side of the sensor substrate, and the second conductor group 12 may be arranged on another surface side of the sensor substrate.

The multiplexer 201 has a function of a switching circuit that connects the sensor 100 to one of the finger touch detecting circuit 202 and the pen indication detecting circuit 203 according to switching control of the control circuit 204.

The finger touch detecting circuit 202 has a function of a first signal detecting circuit configured to detect that the finger 5 is in proximity to the sensor 100 within a predetermined distance of the sensor 100 (which function will hereinafter be referred to as a finger proximity detecting function), and has a function of detecting a position indicated by the finger 5 on the sensor 100 (which function will hereinafter be referred to as a finger touch position detecting function).

As will be described later, a capacitance (self-capacitance) between one of the first conductor group 11 and the second conductor group 12, or each second conductor 12X of the second conductor group 12 in the present embodiment, and a ground (grounding by connection to an earth or an earth conductor of a printed board, wherein the earth conductor provides a common reference potential and is not necessarily connected to the earth) changes when the indicator such as the finger 5 approaches. Thus, by detecting the capacitance (self-capacitance), the finger proximity detecting function of the first signal detecting circuit detects that the indicator, or the finger 5 in the present example, has come into proximity to the sensor 100. The finger touch detecting circuit 202 supplies a detection result detected by the finger proximity detecting function of the first signal detecting circuit to the control circuit 204. Processing operation of the finger proximity detecting function of the first signal detecting circuit of the finger touch detecting circuit 202 will be described later in detail.

In addition, a capacitance (mutual capacitance) between a first conductor 11Y and a second conductor 12X at each point of intersection (cross point) of the sensor pattern formed by making the plurality of first conductors 11Y and the plurality of second conductors 12X intersect each other changes at a position touched and indicated by the indicator such as the finger 5. Thus, by detecting the change in the capacitance (mutual capacitance), the finger touch position detecting function of the finger touch detecting circuit 202 detects the position touched by the finger 5 on the sensor 100.

The finger touch position detecting function of the finger touch detecting circuit 202 in the present embodiment supplies a transmission signal (spread code in the present example, as will be described later) having a frequency f1 of about 50 kHz to 200 kHz, for example, to the first conductors 11Y, and obtains received signals from the second conductors 12X via capacitances (mutual capacitances) between the first conductors 11Y and the second conductors 12X. On the basis of the fact that the capacitance (mutual capacitance) at the position touched by the finger changes, the finger touch position detecting function of the finger touch detecting circuit 202 detects that the level of the received signal having the frequency f1 from the second conductor 12X at the position (correlation level of the spread code) changes, and thereby detects the finger touch position. The finger touch detecting circuit 202 then supplies the detection result of the finger touch position detected by the finger touch position detecting function to the control circuit 204.

The finger proximity detecting function of the finger touch detecting circuit 202 in the present embodiment can detect the second conductor 12X to which the finger 5 has come into proximity on the sensor 100. The finger touch position detecting function therefore sets an area including the second conductor 12X to which the finger 5 has come into proximity and which is detected by the finger proximity detecting function and all of the first conductors 11Y as a detection object area, rather than setting a whole area on the sensor 100 as a detection object area, and detects the finger touch position. Thus, the finger touch detecting circuit 202 can detect the finger touch position efficiently and quickly by the finger touch position detecting function.

The pen indication detecting circuit 203 detects a position indicated by the active capacitive pen 6 on the sensor 100. Part of the pen indication detecting circuit 203 constitutes an example of a second signal detecting circuit. The active capacitive pen 6 internally has a transmission circuit 6S, and sends out a signal from the transmission circuit 6S which has a frequency f2 of 1.8 MHz, for example, from an electrode at a pen point. Incidentally, the transmission circuit 6S may be formed by an oscillator, or may be a circuit that generates the above-described signal by subjecting an oscillating signal generated by an oscillator to processing such as modulation. The pen indication detecting circuit 203 receives the signal from the active capacitive pen 6 not only from the second conductor group 12 of the sensor 100 but also from the first conductor group 11 of the sensor 100. A circuit part that detects the signal from the active capacitive pen 6 which signal has the frequency f2 from the first conductor group 11 of the sensor 100 constitutes an example of the second signal detecting circuit.

Then, the pen indication detecting circuit 203 checks the received signal level of the signal of 1.8 MHz from the active capacitive pen 6 in each of the first conductors 11Y and the second conductors 12X constituting the first conductor group 11 and the second conductor group 12. The pen indication detecting circuit 203 detects the position indicated by the active capacitive pen 6 by detecting the first conductor 11Y and the second conductor 12X in which the signal of 1.8 MHz has a high level. The pen indication detecting circuit 203 then supplies a result of the detection of the position indicated by the active capacitive pen 6 to the control circuit 204.

Incidentally, as described above, in order to detect the positions indicated by the finger 5 and the active capacitive pen 6, the frequency f1 of the signal handled by the finger touch position detecting function of the finger touch detecting circuit 202 is set in a range of 50 to 200 kHz, and the frequency f2 of the signal handled by the pen indication detecting circuit 203 is 1.8 MHz, and thus the usable frequency bands greatly differ from each other. Hence, the signals handled by the finger touch detecting circuit 202 and the pen indication detecting circuit 203 can be separated into the bands by a band-pass filter, for example.

The control circuit 204 is to control operation of the whole of the position detecting device 1. The control circuit 204 is formed by a microprocessor unit (MPU) in the present example. The position detecting device 1 according to the present embodiment performs control so as to detect a finger touch and detect a pen indication on a time-division basis. Specifically, as shown in the upper portion of FIG. 3, the position detecting device 1 according to the present embodiment performs processing in a pen indication detecting period TP for detecting a pen indication and processing in a finger touch detecting period TF for detecting a finger touch alternately on a time-division basis. In this case, the finger touch detecting period TF corresponds to a first detecting period, and the pen indication detecting period TP corresponds to a second detecting period.

By thus performing processing in the pen indication detecting period TP and processing in the finger touch detecting period TF alternately on a time-division basis, the present embodiment can substantially simultaneously detect a position indication by the indicator such as the finger 5 and a position indication by the stylus such as the active capacitive pen 6.

In the pen indication detecting period TP, the control circuit 204 controls the multiplexer 201 so as to connect the sensor 100 to the pen indication detecting circuit 203, and performs control so as to set the pen indication detecting circuit 203 in an operating state (active state).

In the finger touch detecting period TF, the control circuit 204 controls the multiplexer 201 so as to connect the sensor 100 to the finger touch detecting circuit 202, and performs control so as to set the finger touch detecting circuit 202 in an operating state (active state).

Figure 3:
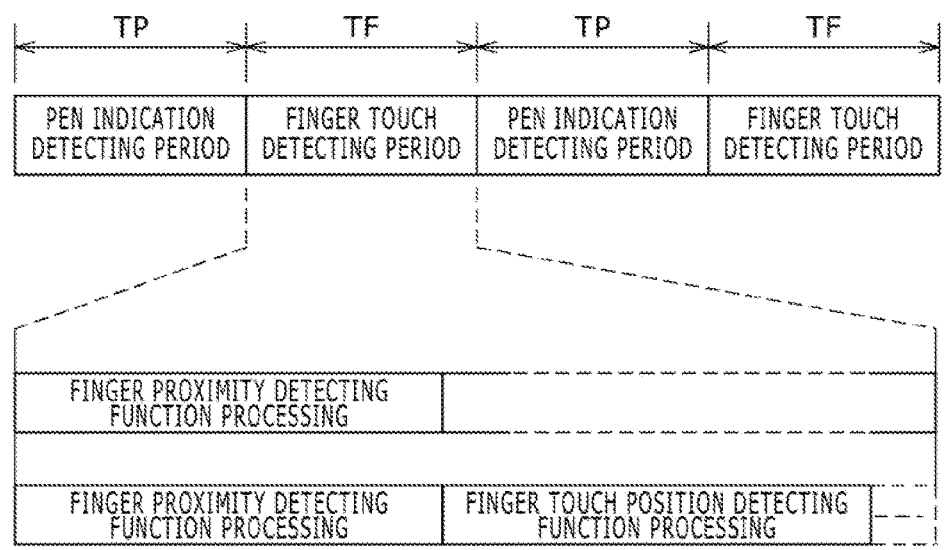
FIG. 3 is a diagram of assistance in explaining an operation of the first embodiment of the sensor signal processing circuit according to the present disclosure.

In the sensor signal processing circuit 200 of the position detecting device 1 according to the present embodiment, as shown in the middle portion of FIG. 3, in the finger touch detecting period TF, the control circuit 204 controls the finger touch detecting circuit 202 such that the finger proximity detecting function of the first signal detecting circuit described above is performed until it is detected that the finger 5 has come into proximity to the sensor 100 within a predetermined distance of the sensor 100. The finger proximity detecting function of the first signal detecting circuit in the present example measures a capacitance (self-capacitance) between each of the second conductors 12X and the ground (earth), compares a result of the measurement with a predetermined threshold value, and thereby determines whether or not the finger 5 has come into proximity to the sensor 100 within the predetermined distance of the sensor 100. In this case, in the finger touch detecting period TF, the finger proximity detecting function of the first signal detecting circuit may be performed only once, or may be repeatedly performed a plurality of times.

When the control circuit 204 then recognizes by the finger proximity detecting function of the first signal detecting circuit that the finger 5 is in proximity to the sensor 100, the control circuit 204 performs switching control of the finger touch detecting circuit 202 so as to stop the above-described finger proximity detecting function and perform the finger touch position detecting function in the finger touch detecting period TF, as shown in the lower portion of FIG. 3. That is, the control circuit 204 controls the finger touch detecting circuit 202 such that in the finger touch detecting period TF, the finger touch detecting circuit 202 first performs the finger proximity detecting function of the first signal detecting circuit in a state of the finger 5 being in proximity to the sensor 100 within the predetermined distance of the sensor 100, and thereafter performs the finger touch position detecting function when the finger proximity state is detected on the basis of a result of the finger proximity detecting function of the first signal detecting circuit.

As described above, the control circuit 204 controls the timing of time-division processing in the pen indication detecting period TP and the finger touch detecting period TF, and performs switching control of the finger proximity detecting function and the finger touch position detecting function in the finger touch detecting period TF.

Figure 4:
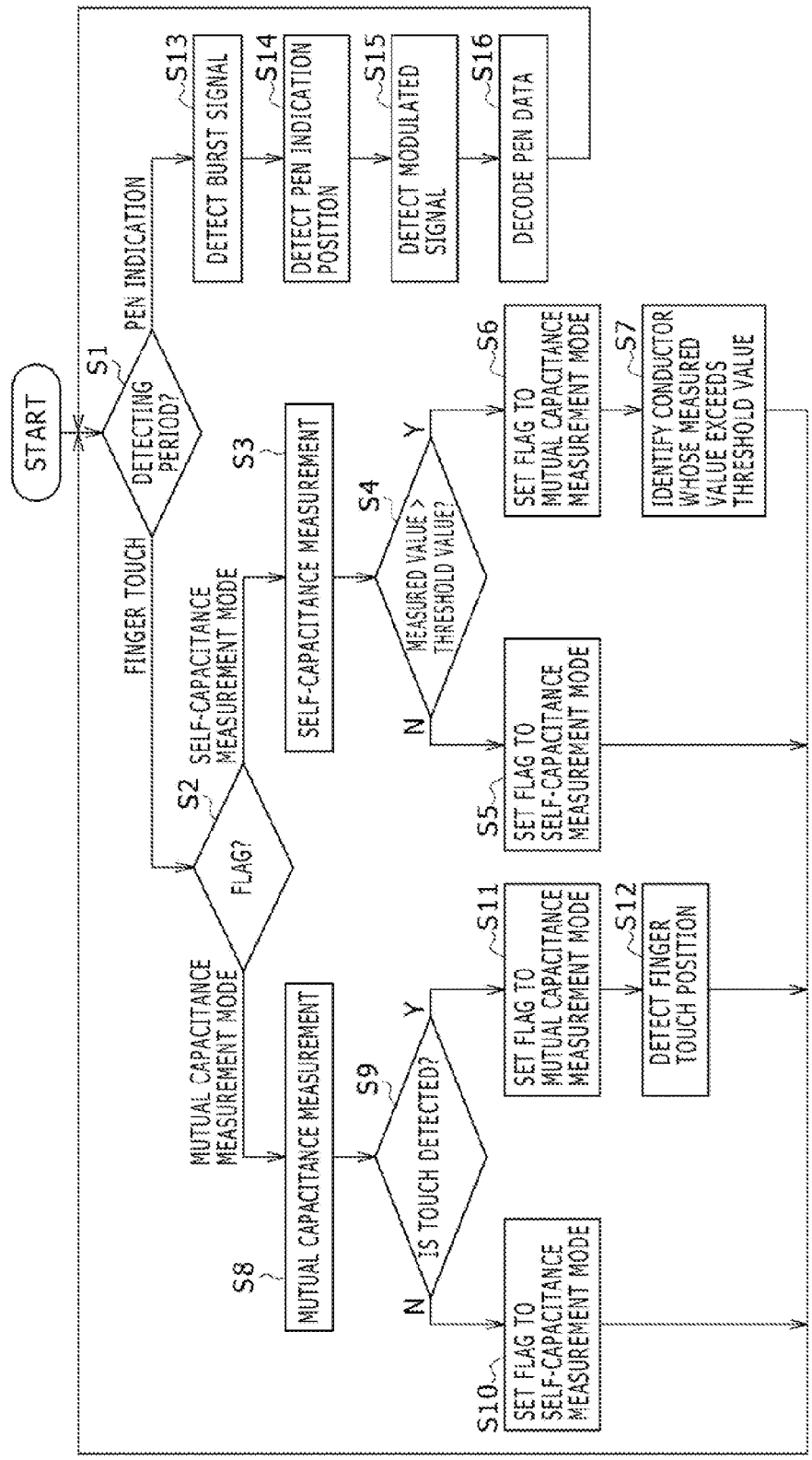
FIG. 4 is a flowchart of assistance in explaining an example of a flow of the operation of the first embodiment of the sensor signal processing circuit according to the present disclosure.

FIG. 4 is a flowchart of assistance in explaining an example of a flow of processing operation for time-division control of the finger touch detecting circuit 202 and the pen indication detecting circuit 203 by the control circuit 204. Incidentally, in the description of this flowchart, a mode in which the finger proximity detecting function is performed in the finger touch detecting period TF will be referred to as a self-capacitance measurement mode, and a mode in which the finger touch position detecting function is performed in the finger touch detecting period TF will be referred to as a mutual capacitance measurement mode.

When power to the position detecting device 1 is turned on, the control circuit 204 makes a timer for time-division processing timing measurement start to measure time. The control circuit 204 monitors the time measured by the timer, and determines whether a present point in time is in the pen indication detecting period TP or in the finger touch detecting period TF (step S1).

When determining in step S1 that the present point in time is in the finger touch detecting period TF, the control circuit 204 refers to a flag indicating one of the self-capacitance measurement mode and the mutual capacitance measurement mode (step S2). When the setting of the flag indicates the self-capacitance measurement mode in step S2, the control circuit 204 performs control so as to carry out self-capacitance measurement for the finger proximity detecting function of the first signal detecting circuit in the finger touch detecting circuit 202 (step S3). That is, the control circuit 204 performs control so as to measure a value corresponding to a capacitance (self-capacitance) Cx between each of the second conductors 12X constituting the second conductor group 12 and the ground in the finger touch detecting circuit 202. A method of measuring the value corresponding to the self-capacitance Cx of each of the second conductors 12X in this step S3 will be described later in detail. In the present embodiment, the respective self-capacitances Cx of all of the second conductors 12X can be measured simultaneously.

Incidentally, in step S3, instead of measuring the capacitances between all of the second conductors 12X constituting the second conductor group 12 and the ground, the conductors to be searched may be reduced in number by selecting conductors whose capacitances (self-capacitances) are detected according to a predetermined conductor selecting sequence such that every second conductor is selected, every third conductor is selected, . . . .

Next, the control circuit 204 compares all of the values (measured values) corresponding to the capacitances (self-capacitances) Cx between the second conductors 12X measured in step S3 and the ground with a threshold value determined in advance, and determines whether or not there is a second conductor 12X whose measured value is larger than the threshold value (step S4). Here, the threshold value is determined in advance in consideration of the following.

When the finger 5 approaches the sensor 100, a capacitance (self-capacitance) Cx between a second conductor 12X and the ground changes according to a distance from the sensor surface 100S to the finger 5. In the present example, a state in which the finger 5 has come into proximity to reach a position in the air which position is distant from the sensor surface 100S by 1 to 2 cm, for example, is considered to be a hovering state before an operation by the user of indicating a position on the sensor 100 with the finger 5. Hence, the value corresponding to the capacitance (self-capacitance) Cx between the second conductor 12X and the ground in the state in which the finger 5 is in proximity at the position in the air which position is distant from the sensor surface 100S by 1 to 2 cm, for example, is set as the threshold value.

When determining in step S4 that the measured values in step S3 of all of the second conductors 12X do not exceed the threshold value, the control circuit 204 sets the flag to the state of the self-capacitance measurement mode, and returns the processing to step S1 (step S5).

When determining in step S4 that there is a second conductor 12X whose measured value in step S3 exceeds the threshold value, the control circuit 204 sets the flag to the state of the mutual capacitance measurement mode (step S6), and identifies the second conductor 12X whose measured value exceeds the threshold value (step S7). The control circuit 204 then returns the processing from step S7 to step S1.

When the setting of the flag indicates the mutual capacitance measurement mode in step S2, the control circuit 204 sets an area including the second conductor 12X identified in step S7 and all of the first conductors 11Y as a finger touch position detection target area, or sets a region in the vicinity of a position at which a finger touch was detected immediately previously as a finger touch position detection target area, and performs control so as to carry out mutual capacitance measurement for the finger touch position detecting function in the finger touch detecting circuit 202 (step S8). Specifically, the control circuit 204 performs control such that the finger touch detecting circuit 202 starts to supply the transmission signal having the frequency f1 to the first conductors 11Y, and detects a finger touch by detecting a change in capacitance (mutual capacitance) in a region (cross point) formed between each of the first conductors 11Y constituting the first conductor group 11 and the second conductor 12X whose measured value exceeds the threshold value and which is recognized in step S7 among the second conductor group 12, or in the region (cross point) in the vicinity of the position at which a finger touch was detected immediately previously.

Next, the control circuit 204 determines whether or not a finger touch is detected (step S9). When determining that no finger touch is detected, the control circuit 204 sets the flag to the state of the self-capacitance measurement mode (step S10), and returns the processing to step S1.

When determining in step S9 that a finger touch is detected, the control circuit 204 sets the flag to the state of the mutual capacitance measurement mode (step S11), and detects a position on the sensor 100 which position is indicated by the finger touch (step S12). When the processing of step S12 is ended, the control circuit 204 returns the processing to step S1 to repeat the processing from step S1 on down.

When determining in step S1 that the present point in time is not in the finger touch detecting period but within the pen indication detecting period TP, the control circuit 204 performs control so as to connect, to the sensor 100, a circuit part (second signal detecting circuit) in the pen indication detecting circuit 203 which circuit part receives the signal from the active capacitive pen 6 which signal has the frequency f2 not only from the second conductor group 12 of the sensor 100 but also from the first conductor group 11 of the sensor 100. Then, the pen indication detecting circuit 203 monitors the signal from the active capacitive pen 6 which signal has the frequency f2, and detects a burst signal having the frequency f2 from the active capacitive pen 6 as each of received signals from a first conductor 11Y and a second conductor 12X (step S13).

Next, the control circuit 204 determines which of the first conductors 11Y and the second conductors 12X are selected when the burst signal is detected, and detects a position on the sensor 100 which position is determined by the positions of the identified first conductor 11Y and the identified second conductor 12X as a position indicated by the active capacitive pen 6 (step S14).

After the processing of step S14 is ended, the control circuit 204 detects a modulated signal (pen pressure data, pen identifying information, and the like) transmitted following the burst signal when the identified first conductor 11Y and the identified second conductor 12X are selected (step S15). Then, the detected modulated signal is subjected to demodulation processing, and data such as a pen pressure in the active capacitive pen 6 and the identifying information of the active capacitive pen 6 is decoded (step S16). After the processing of step S16 is ended, the control circuit 204 returns the processing to step S1 to repeat the processing from step S1 on down.

Incidentally, step S5 and step S11 leave the flag as it is rather than changing the flag, and may therefore be omitted.

As described above, in the present embodiment, in the finger touch detecting period TF, the finger touch detecting circuit 202 performs the finger proximity detecting function of the first signal detecting circuit until the finger 5 approaches a predetermined position on the sensor 100. The finger touch detecting circuit 202 thereby detects the proximity of the finger 5 to the sensor 100 on the basis of a change in capacitance between a conductor and the ground. Then, when recognizing that the finger 5 further comes into proximity to the sensor 100, the finger touch detecting circuit 202 performs the finger touch position detecting function, and thereby detects a position on the sensor 100 which position is indicated by the finger 5 on the basis of a capacitance change (mutual capacitance change) in a region (cross point) formed between the first conductor 11Y and the second conductor 12X.

That is, when the finger 5 is distant from the sensor 100 by a predetermined distance or more, the proximity of the finger 5 to the sensor 100 is detected on the basis of a change in capacitance (change in self-capacitance) between a conductor and the ground. Thus, good sensitivity is achieved even when the finger 5 is located at a position distant from the sensor 100. In addition, the proximity of the finger 5 can be detected efficiently by adopting finger detection processing that reduces power consumption. When it is recognized that the finger 5 has further approached the sensor 100, the positions of a plurality of fingers on the sensor 100 are determined on the basis of a capacitance change (mutual capacitance change) in each of the regions (cross points) formed between the first conductors 11Y and the second conductors 12X. That is, the detection of the position of the finger 5 based on a change in capacitance at each of a large number of cross points is performed in response to recognizing that the finger 5 has further come into proximity to the sensor 100. Thus, signal processing that imposes a heavy load of the signal processing and consumes a large amount of power is performed for the first time when the processing becomes necessary.

Furthermore, in the present embodiment, in the detection of a finger touch position, the area of the second conductor 12X to which the finger 5 has come into proximity among the second conductors 12X of the sensor 100 is set as a target, and is therefore reduced as compared with a case where a finger touch detection area including all of the second conductors 12X is set as a target in the detection of a finger touch position. Thus, a finger touch position can be detected with a high degree of efficiency and with low power consumption.

Incidentally, in the detection of a finger touch position, the area of all of the second conductors 12X may of course be set as a target rather than setting only the area of the second conductor 12X to which the finger 5 has come into proximity as a target.

Incidentally, though not described above, in the present embodiment, when the active capacitive pen 6 (stylus) is detected by detecting a burst signal in step S13, and a position indicated by the active capacitive pen 6 is detected in step S14, the period length of the pen indication detecting period TP determined in advance is changed so as to be long relative to the period length of the finger touch detecting period TF. In this case, the period lengths of both of the pen indication detecting period TP and the finger touch detecting period TF determined in advance may be changed, or one of the pen indication detecting period TP and the finger touch detecting period TF may be changed. Consequently, when the active capacitive pen 6 (stylus) is detected on the sensor 100, the detection of the active capacitive pen 6 (stylus) is always given priority over that of the indicator such as the finger 5.

[An Example of Configuration of the Finger Touch Detecting Circuit 202]

Figure 5:
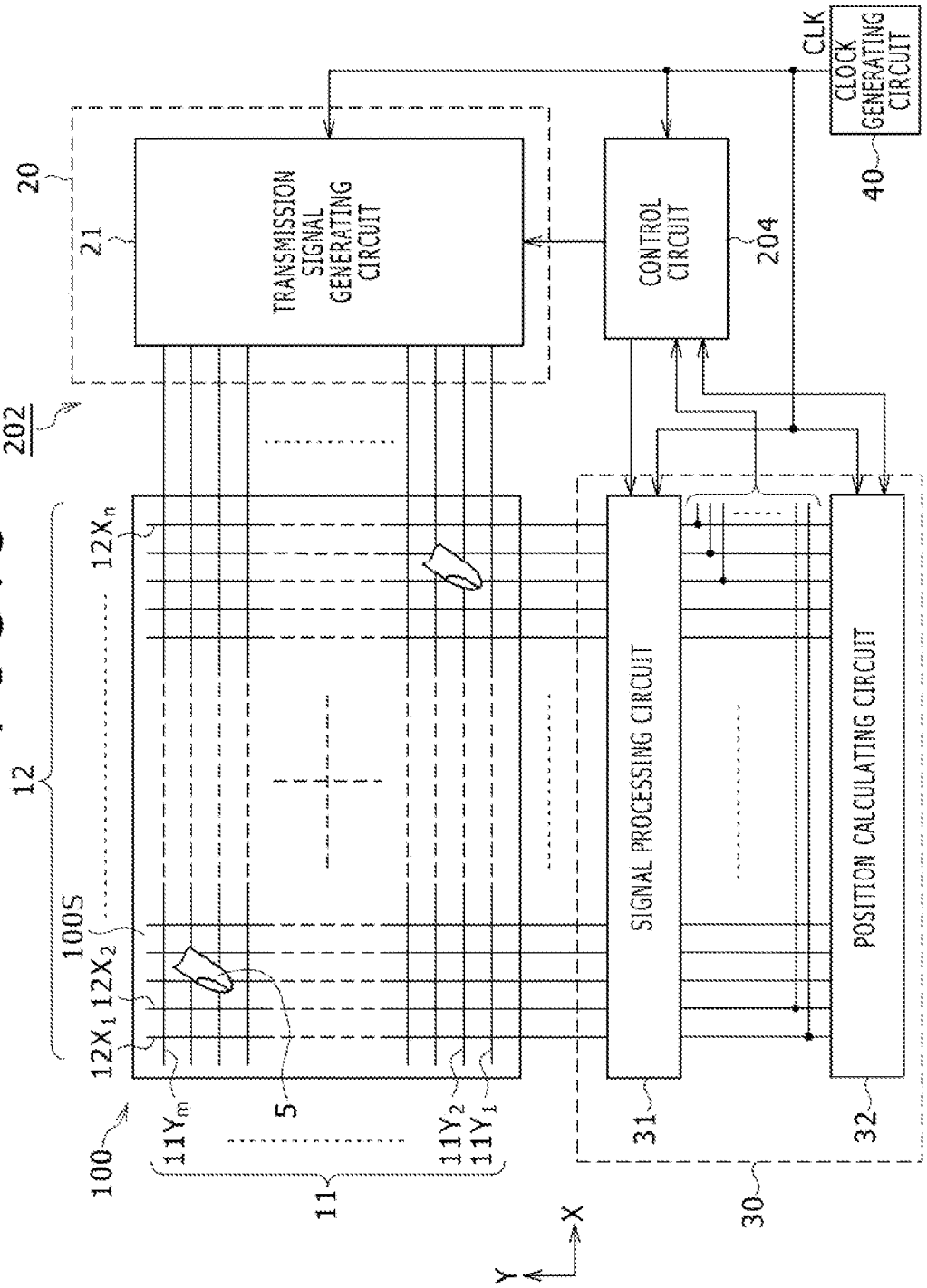
FIG. 5 is a block diagram showing an example of configuration of a finger touch detecting circuit in the first embodiment of the sensor signal processing circuit according to the present disclosure.

FIG. 5 shows mainly constituent parts configured to determine the positions of a plurality of fingers on the sensor 100 on the basis of a capacitance change in each of the regions (cross points) formed between the first conductors 11Y and the second conductors 12X in the finger touch detecting period TF of the position detecting device 1 according to the present embodiment, that is, mainly the constituent parts of the finger touch detecting circuit 202 within the sensor signal processing circuit 200 shown in FIG. 2. The parts of the multiplexer 201 and the pen indication detecting circuit 203 are omitted in FIG. 5. Incidentally, in the following description of the first embodiment, for convenience, the first conductors 11Y will be referred to as transmitting conductors 11Y, and the second conductors 12X will be referred to as receiving conductors 12X.

As shown in FIG. 5, the finger touch detecting circuit 202 includes a transmitting section 20 and a receiving section 30. The transmitting section 20 includes a transmission signal generating circuit 21. The receiving section 30 includes a signal processing circuit 31 and a position calculating circuit 32. A clock generating circuit 40, which is not shown in FIG. 2, is a circuit that generates a predetermined clock signal CLK and supplies the clock signal CLK to various parts, and is included in the control circuit 204 in some cases. When the finger touch detecting circuit 202 performs the finger touch position detecting function, both of the transmitting section 20 and the receiving section 30 are set in an operating state to detect a position indicated by the finger 5, as will be described later.

When the finger touch detecting circuit 202 performs the finger proximity detecting function of the first signal detecting circuit, on the other hand, the transmitting section 20 is not set in an operating state, nor is the transmission signal supplied to the transmitting conductors 11Y. As will be described later, when the finger touch detecting circuit 202 performs the finger proximity detecting function of the first signal detecting circuit, the signal processing circuit 31 of the receiving section 30 performs voltage supply control on the basis of control of the control circuit 204. The signal processing circuit 31 thereby functions to detect a change in capacitance (self-capacitance) between a receiving conductor 12X and the ground (earth), and supplies a result of the detection to the control circuit 204. The control circuit 204 detects a state of proximity of the finger 5 to the sensor 100.

[Description of a Configuration for the Finger Touch Position Detecting Function in the Finger Touch Detecting Circuit 202]

In the present embodiment, the transmission signal generating circuit 21 of the transmitting section 20 generates m different transmission signals, for example 46 different transmission signals, and supplies the predetermined transmission signals to each of the transmitting conductors $11Y_1$, $11Y_2$, ..., and $11Y_m$ in timing formed on the basis of the clock signal CLK from the clock generating circuit 40 according to control of the control circuit 204. Incidentally, pseudo random noise (PN) codes, Hadamard codes, and other orthogonal codes, for example, are applicable as concrete examples of the transmission signals supplied to each of the m transmitting conductors $11Y_1$ to $11Y_m$. In this case, transmission code is supplied from the control circuit 204 to the transmission signal generating circuit 21.

When the finger touch detecting circuit 202 of the position detecting device 1 according to the present embodiment performs the finger touch position detecting function, the finger touch detecting circuit 202 detects a position indicated by the indicator such as the finger 5 on the basis of a change in capacitance (mutual capacitance) between a transmitting conductor 11Y and the receiving conductor 12X recognized by the finger proximity detecting function as a receiving conductor to which the finger 5 has come into proximity in the regions (cross points) formed by each of the transmitting conductors $11Y_1$, $11Y_2$, ..., and $11Y_m$ and each of the receiving conductors $12X_1$, $12X_2$, ..., and $12X_n$. The finger touch detecting circuit 202 monitors received signals from the receiving conductor 12X recognized by the finger proximity detecting function as a receiving conductor to which the finger 5 has come into proximity, and detects which transmitting conductor 11Y is supplied with the transmission signal corresponding to the received signal that is changed. The finger touch detecting circuit 202 thereby detects a finger touch position.

Specifically, when the finger 5 touches the sensor 100, a state occurs which is equivalent to a state in which a capacitance Cg (not shown) between the finger 5 and the ground (earth) is connected to the position of the cross point touched by the finger 5, and the transmission signal flows to the ground via the finger 5 and the capacitance Cg. Therefore, the level of the received signal of the receiving conductor 12X at the position of the cross point touched by the finger 5 is lower than the levels of the received signals of the other receiving conductors 12X.

The receiving section 30 of the position detecting device 1 according to the present embodiment detects the position of the receiving conductor 12X at the cross point where the capacitance (mutual capacitance) is changed, by detecting a change (decrease) in the level of the received signal of each receiving conductor 12X recognized by the finger proximity detecting function as a receiving conductor to which the finger 5 has come into proximity. In addition, the received signal includes information for identifying which of the transmitting conductors $11Y_1$, $11Y_2$, ..., and $11Y_m$ transmitted the transmission signal. The receiving section 30 detects the position of the transmitting conductor 11Y at the cross point where the capacitance (mutual capacitance) is changed from this identifying information, and thus detects, for each cross point, a change in the signal which change corresponds to the change in the capacitance (mutual capacitance) at the cross point. It is thereby possible to identify the cross point where the capacitance (mutual capacitance) is changed so as to correspond to the approaching or touching of the sensor 100 by the indicator such as the finger 5.

Incidentally, the received signal from each of the receiving conductors 12X is supplied to the signal processing circuit 31 so that the respective received signals from the receiving conductors $12X_1$ to $12X_n$ are simultaneously subjected to analog-digital (A-D) conversion (analog to digital conversion). Then, as will be described later in detail, the signal processing circuit 31 performs A-D conversion of the signals from the respective receiving conductors $12X_1$ to $12X_n$.

Then, the position calculating circuit 32 calculates a correlation operation value by performing a correlation operation using a signal (code) corresponding to the transmission signal (spread code) supplied from the transmission signal generating circuit 21 to each of the transmitting conductors $11Y_1$, $11Y_2$, ..., and $11Y_m$. For this purpose, a signal (correlation operation signal) to be used for the correlation operation is supplied from the control circuit 204 to the position calculating circuit 32. The position calculating circuit 32 then operates according to control of the control circuit 204 to calculate the position indicated by the indicator such as the finger 5 on the sensor 100 on the basis of the calculated correlation operation value. Output data in accordance with the position indicated by the indicator is for example supplied to a display control section or the like provided to the portable apparatus, the display control section or the like being not shown in the figures, whereby display in accordance with the position indicated by the indicator is made on the display screen.

The position detecting device 1 according to the present embodiment having such a configuration can supply transmission signals to the m respective transmitting conductors $11Y_1$ to $11Y_m$ simultaneously, and process received signals from the n receiving conductors $12X_1$ to $12X_n$ simultaneously. Then, the position detecting device 1 can detect the position indicated by the indicator on the sensor surface 100S on the basis of the state of the indication by the indicator at the m×n cross points formed by the m transmitting conductors $11Y_1$ to $11Y_m$ and the n receiving conductors $12X_1$ to $12X_n$.

[Description of a Configuration for the Finger Proximity Detecting Function of the First Signal Detecting Circuit in the Finger Touch Detecting Circuit 202]

In the present embodiment, a configuration for the finger proximity detecting function of the first signal detecting circuit in the finger touch detecting circuit 202 is formed by the signal processing circuit 31 and the control circuit 204, and the position calculating circuit 32 of the receiving section 30 also takes part in the finger proximity detecting function. In the first embodiment, the signal processing circuit 31 has a configuration as later described. The signal processing circuit 31 is thereby switched under control of the control circuit 204 between a case where the signal processing circuit 31 operates for the finger proximity detecting function of the first signal detecting circuit and a case where the signal processing circuit 31 operates for the finger touch position detecting function.

[A Concrete Example of Configuration of the Signal Processing Circuit 31]

Description will next be made of an example of configuration of the signal processing circuit 31 as well as the operation of the signal processing circuit 31 at the time of the above-described finger proximity detecting function and the operation of the signal processing circuit 31 at the time of the finger touch position detecting function.

Figure 6:
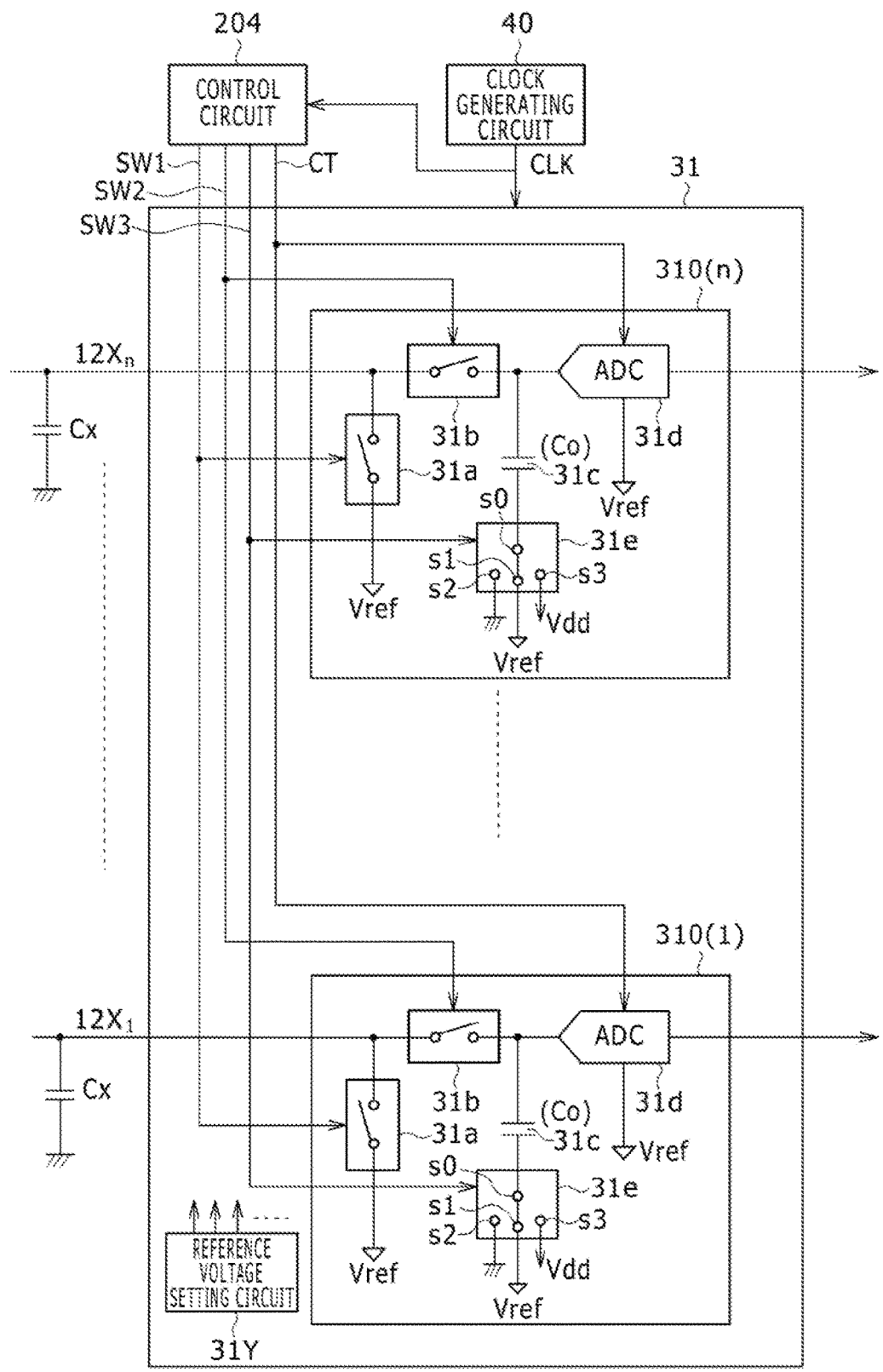
FIG. 6 is a diagram showing an example of configuration of part of the finger touch detecting circuit in the first embodiment of the sensor signal processing circuit according to the present disclosure.

FIG. 6 is a diagram of assistance in explaining an example of configuration of the signal processing circuit 31. As shown in FIG. 6, the signal processing circuit 31 includes n signal processing circuits 310(1) to 310(n) corresponding to the n respective receiving conductors $12X_1$ to $12X_n$. Each of the n signal processing circuits 310(1) to 310(n) has a same configuration. Therefore, in the following description, except for a case where each of the signal processing circuits 310(1) to 310(n) is particularly distinguished from the other, one of the signal processing circuits 310(1) to 310(n) will be described as a signal processing circuit 310. Incidentally, while the signal processing circuit 310 can be configured by electrically connecting a plurality of constituent elements as discrete parts to each other, the signal processing circuit 310 in the present example has a configuration of an integrated circuit (IC) on one chip.

In the present embodiment, the signal processing circuit 31 uses a single power supply from which a power supply voltage Vdd is supplied.

As shown in FIG. 6, the signal processing circuit 310 includes: a switch circuit 31a constituting a clamp circuit; a gate circuit 31b for sampling; a capacitor circuit 31c configured to hold a sampled voltage; an analog digital converter (ADC) 31d; and a switch circuit 31e for voltage switching configured to measure a change in capacitance between the receiving conductor 12X and the ground.

In the first embodiment, as shown in FIG. 6, the control circuit 204 supplies the switch circuit 31a with a switching control signal SW1, supplies the gate circuit 31b with a gate control signal SW2, and supplies the switch circuit 31e with a switching control signal SW3. The control signals SW1 to SW3 are synchronized with the clock signal CLK from the clock generating circuit 40. The ADC 31d is controlled to be operative/inoperative by an operation control signal CT from the control circuit 204.

One terminal of the switch circuit 31a constituting a clamp circuit is connected to the receiving conductor 12X, and another terminal of the switch circuit 31a is set at a predetermined voltage, or a reference voltage Vref to be described later in the present example. One terminal of the gate circuit 31b is also connected to the receiving conductor 12X. Another terminal of the gate circuit 31b is connected to one terminal of the capacitor circuit 31c and an input terminal of the ADC 31d. Another terminal of the capacitor circuit 31c is connected to a common terminal s0 of the switch circuit 31e. The ADC 31d converts a voltage occurring at the one terminal of the capacitor circuit 31c into a digital signal.

The switch circuit 31e is a switching circuit capable of switching connection of the common terminal s0 to three terminals s1, s2, and s3. One terminal s1 of the three terminals is set at a predetermined voltage, or a reference voltage Vref in the present example. Another terminal s2 is set at a voltage lower than the predetermined voltage (reference voltage Vref) by a predetermined value EV, or a ground potential GND in the present example. The other terminal s3 is set at a voltage higher than the predetermined voltage Vref by the predetermined value EV, or a power supply voltage Vdd in the present example. When the signal processing circuit 31 operates for the finger touch position detecting function, the switch circuit 31e is always switched to the terminal s1 that selects the reference voltage Vref. As will be described later, the other terminals s2 and s3 of the switch circuit 31e are used when the signal processing circuit 31 operates for the finger proximity detecting function of the first signal detecting circuit.

The switch circuit 31a is turned on by the switching control signal SW1 from the control circuit 204, and thereby clamps each receiving conductor 12X to a predetermined voltage. The gate circuit 31b is subjected to on-off control (opening and closing control) by the gate control signal SW2 from the control circuit 204. In an on period (closed period) of the gate circuit 31b, the gate circuit 31b connects, to the capacitor circuit 31c, the receiving conductor 12X clamped at the predetermined voltage through the switch circuit 31a constituting a clamp circuit. The capacitor circuit 31c stores, via the gate circuit 31b, a charge corresponding to the predetermined voltage set by clamping the receiving conductor 12X. A voltage occurring in the capacitor circuit 31c so as to correspond to the charge stored in the capacitor circuit 31c is converted into a digital signal by the ADC 31d.

[Operation in the Finger Touch Position Detecting Function of the Signal Processing Circuit 310]

Figure 7:
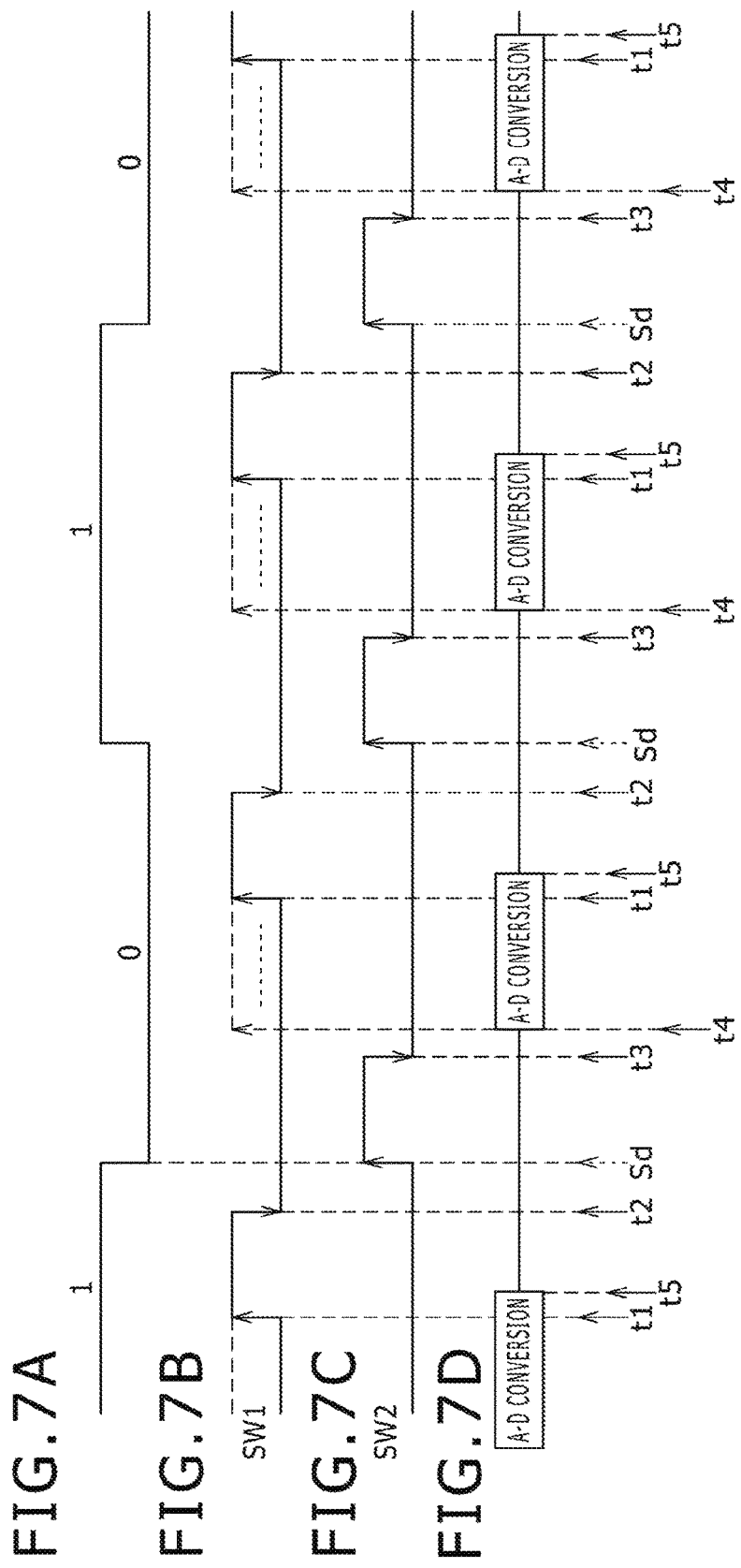
FIGS. 7A, 7B, 7C, and 7D are diagrams of assistance in explaining an operation of the finger touch detecting circuit in the first embodiment of the sensor signal processing circuit according to the present disclosure.

FIGS. 7A to 7D are timing diagrams of assistance in explaining operation in the finger touch position detecting function of the signal processing circuit 310 according to the first embodiment. FIG. 7A shows a concrete example of a transmission signal (transmission code) generated in the transmission signal generating circuit 21. FIG. 7B shows the switching control signal SW1 supplied from the control circuit 204 to the switch circuit 31a. FIG. 7C shows the gate control signal SW2 supplied from the control circuit 204 to the gate circuit 31b. FIG. 7D shows timing of A-D conversion in the ADC 31d.

As shown in FIG. 7A, suppose in the present example that a signal (transmission code) supplied to the transmitting conductor 11Y is "1010," for example. A signal having a signal level corresponding to the signal level of the transmission signal (transmission code) shown in FIG. 7A is supplied from the transmitting section 20 to the transmitting conductor 11Y. Time point Sd in FIGS. 7A to 7D represents timing in which the signal level of the transmission signal can change.

The switch circuit 31a is turned on by the switching control signal SW1 shown in FIG. 7B after the gate circuit 31b is turned off (opened state) by the gate control signal SW2 shown in FIG. 7C. The voltage of the receiving conductor 12X is quickly clamped to the reference voltage Vref by turning on the switch circuit 31a. Incidentally, the switch circuit 31a and the gate circuit 31b are often set in an on state (closed state) to surely clamp the capacitor circuit 31c to the reference voltage Vref.

Then, the switch circuit 31a is switched to an off state at time point t2 between a time point at which the voltage of the receiving conductor 12X becomes stable after being clamped to the reference voltage Vref and time point Sd. Incidentally, it suffices to turn off the switch circuit 31a before time point Sd as timing of a next change in the signal level of the transmission signal, and the time point at which the switch circuit 31a is turned off is not limited to time point t2 in the example of FIG. 7B. In addition, it suffices to switch on the switch circuit 31a in a period from A-D conversion start time point t4 to A-D conversion end time point t5, and the time point at which the switch circuit 31a is turned on is not limited to time point t1 in the example of FIG. 7B.

In the present embodiment, as shown in FIG. 7C, the gate circuit 31b is turned on (closed state) by the gate control signal SW2 at time point Sd as timing in which the signal level of the transmission signal can change. Then, when the gate circuit 31b is controlled to be in an on (closed) state, a charge corresponding to the voltage of the receiving conductor 12X is stored in the capacitor circuit 31c. Incidentally, it suffices for the time point at which the gate circuit 31b is turned on (closed state) to be a time point after an end of A-D conversion.

The gate circuit 31b is turned off (opened state) at time point t3, which is after the time point Sd as timing in which the signal level of the signal supplied to the transmitting conductor 11Y can change and which is before A-D conversion start time point t4. When the gate circuit 31b is turned off (opened state), the capacitor circuit 31c retains a voltage corresponding to the signal level of a received signal. The ADC 31d subjects the voltage retained by the capacitor circuit 31c to A-D conversion. A digital signal corresponding to the signal level of the received signal is thereby output from the ADC 31d.

As described above, the switch circuit 31a is subjected to switching control, and the gate circuit 31b is subjected to opening and closing control. The switch circuit 31a is thereby turned on in a predetermined period prior to time point Sd at which the signal level of the transmission signal is changed. The receiving conductor 12X is thus clamped to the reference voltage Vref (Vref=½·Vcc).

Then, because the received signal corresponding to the signal supplied to the transmitting conductor 11Y is supplied to the signal processing circuit 310 connected to the receiving conductor 12X, a voltage corresponding to the received signal, which voltage varies in signal level with the reference voltage Vref as a center voltage, is generated in the capacitor circuit 31c by setting the gate circuit 31b in an on state (closed state) during the period from time point Sd to time point t3 and thereby connecting the receiving conductor 12X clamped to the reference voltage Vref to the capacitor circuit 31c via the gate circuit 31b. Then, as shown in FIG. 7D, the ADC 31d converts the voltage corresponding to the received signal which voltage is generated in the capacitor circuit 31c into a digital signal.

The A-D conversion processing on the voltage retained in the capacitor circuit 31c in the ADC 31d is started at time point t4 after time point t3, and is ended at a subsequent time point t5. The ADC 31d outputs the digital signal corresponding to the voltage retained in the capacitor circuit 31c. Incidentally, the ADC 31d is controlled so as to operate in the operating timing shown in FIG. 7D by the operation control signal CT from the control circuit 204.

Incidentally, the control circuit 204 sets each of time points t1, t2, t3, t4, t5, and Sd on the basis of the clock signal CLK generated in the clock generating circuit 40.

[Operation of the Finger Proximity Detecting Function of the Signal Processing Circuit 310 (Operation of the First Signal Detecting Circuit)]

A capacitance Cx connected to the receiving conductor 12X in FIG. 6 represents the self-capacitance of the receiving conductor 12X. The self-capacitance Cx includes a pattern capacitance and a stray capacitance of the receiving conductor 12X. When the finger 5 does not touch the receiving conductor 12X, the self-capacitances Cx of all of the receiving conductors 12X are substantially equal to each other. However, the stray capacitance of the receiving conductor 12X to which the finger 5 is in proximity increases. Hence, the proximity of the finger 5 to the receiving conductor 12X can be detected by detecting a change (increase) in the self-capacitance Cx of the receiving conductor 12X.

In the present embodiment, a change in the self-capacitance Cx of the receiving conductor 12X is detected as a change in the voltage retained in the capacitor circuit 31c. In the present embodiment, the ADC 31d converts the voltage retained in the capacitor circuit 31c into a digital signal. Thus, the change in the self-capacitance Cx of the receiving conductor 12X is detected from the digital signal from the ADC 31d which digital signal corresponds to the voltage retained in the capacitor circuit 31c.

In the present embodiment, a signal corresponding to the self-capacitance Cx is obtained as the output digital signal of the ADC 31d, utilizing the fact that when the capacitor circuit 31c is discharged through the self-capacitance Cx or charged through the self-capacitance Cx, the voltage of the capacitor circuit 31c on the side of the terminal connected to the ADC 31d changes according to the self-capacitance Cx at that time.

In the present embodiment, the control circuit 204 controls the switched states of the switch circuits 31a and 31e and the opened/closed state of the gate circuit 31b so as to obtain the signal corresponding to the self-capacitance Cx affected according to a state of proximity of the finger 5 to the sensor 100. Thus, on the basis of this signal, the state of proximity of the finger 5 to the sensor 100 can be detected with high sensitivity.

As described above, when the finger proximity detecting function is performed, the transmitting section 20 is not operated, and therefore the receiving section 30 does not perform the operation of processing received signals. As will be described in the following, the control circuit 204 performs voltage switching control by switching the switch circuits 31a and 31e and opening and closing timing control of the gate circuit 31b in the signal processing circuit 310, and thereby measures the self-capacitance Cx on the basis of the voltage switching control.

First, the control circuit 204 switches the switch circuit 31e to the ground potential GND side via the terminal s2, turns on the switch circuit 31a, and turns the gate circuit 31b on (closed state), by the switching control signals SW1, SW2, and SW3. The control circuit 204 thus connects the one terminal side of the capacitor circuit 31c and the receiving conductor 12X to each other. Thereby, the one terminal side of the gate circuit 31b to which terminal side the receiving conductor 12X is connected is temporarily clamped to the reference voltage Vref, and the one terminal side of the capacitor circuit 31c which terminal side is connected to the other terminal side of the gate circuit 31b is clamped to the reference voltage Vref.

Next, the control circuit 204 holds the gate circuit 31b as it is in the on state (closed state), turns off the switch circuit 31a, and switches the switch circuit 31e to the terminal s3 side, by the switching control signals SW1, SW2, and SW3.

The control circuit 204 thus sets, to the power supply voltage Vdd, the other terminal of the capacitor circuit 31c on an opposite side from the one terminal side of the capacitor circuit 31c which terminal side is connected to the other terminal side of the gate circuit 31b. Thereby, the one terminal side of the capacitor circuit 31c is charged up to the power supply voltage Vdd, and a charge flows to the other terminal of the gate circuit 31b and is stored in the external electrode capacitance (self-capacitance) through the gate circuit 31b.

Next, the control circuit 204 turns the gate circuit 31b off (opened state) by the gate control signal SW2, and controls the ADC 31d into an operating state by the operation control signal CT. The control circuit 204 thus converts the voltage retained in the capacitor circuit 31c into a digital signal D1+ by the ADC 31d, and temporarily stores the digital signal D1+. The self-capacitance Cx can be detected from the digital signal D1+ obtained by the above processing. The control circuit 204 then performs the comparison processing described in step S4 in FIG. 4 for the signal corresponding to the self-capacitance Cx of the receiving conductor 12X, and thereby determines whether or not the finger 5 is in proximity to the receiving conductor 12X. When it is detected that the finger 5 is in proximity, the finger touch detecting function is started.

[An Example of Configuration of the Pen Indication Detecting Circuit 203]

Figure 8:
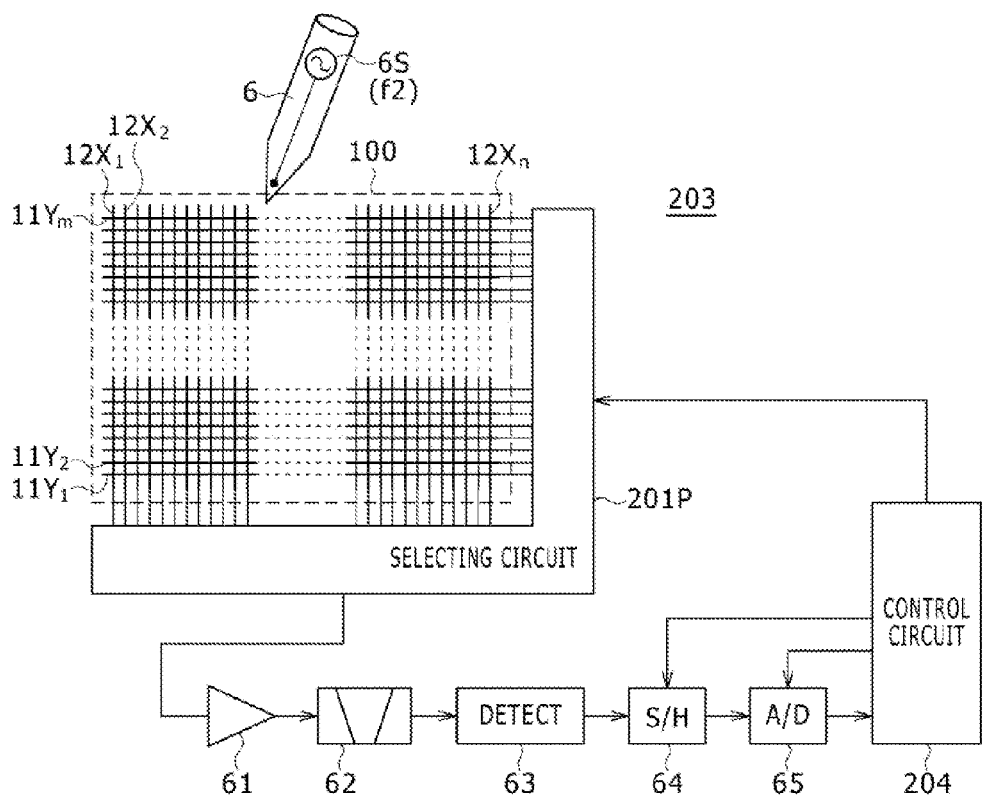
FIG. 8 is a block diagram showing an example of configuration of a pen indication detecting circuit in the first embodiment of the sensor signal processing circuit according to the present disclosure.

FIG. 8 shows mainly constituent parts of the pen indication detecting circuit 203 within the sensor signal processing circuit 200 shown in FIG. 2. The part of the finger touch detecting circuit 202 is omitted in FIG. 8. The multiplexer 201 functions as a selecting circuit 201P in FIG. 8 for the pen indication detecting circuit 203. The selecting circuit 201P selects one conductor from each of the transmitting conductor group 11 and the receiving conductor group 12.

The conductor selected by the selecting circuit 201P is connected to an amplifying circuit 61. A signal from the active capacitive pen 6 is detected by the selected conductor, and amplified by the amplifying circuit 61. The output of the amplifying circuit 61 is supplied to a band-pass filter 62, so that only a component having the frequency f2 which component is transmitted from the active capacitive pen 6 is extracted.

The output signal of the band-pass filter 62 is detected by a detecting circuit 63. The output signal of the detecting circuit 63 is supplied to a sample and hold circuit 64 to be sampled and held in predetermined timing, and thereafter converted into a digital value by an analog to digital (AD) converting circuit 65. This digital data is read and processed by the control circuit 204.

The control circuit 204 operates so as to send out respective control signals to the sample and hold circuit 64, the AD converting circuit 65, and the selecting circuit 201P according to a program stored in an internal read only memory (ROM).

Figure 9A:
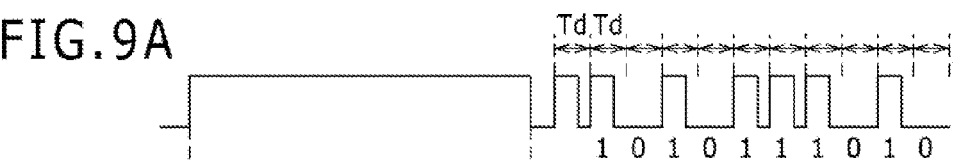
FIGS. 9A, 9B, and 9C are diagrams of assistance in explaining an operation of principal parts of the pen indication detecting circuit in the first embodiment of the sensor signal processing circuit according to the present disclosure.
Figure 9B:
Figure 9C:

FIGS. 9A to 9C are diagrams of assistance in explaining the signal from the active capacitive pen 6 as a position indicator which signal is received by the sensor 100 of the position detecting device 1. The active capacitive pen 6 includes a control circuit, which is not shown in the figures. A control signal from the control circuit controls the output of a transmission signal from the transmission circuit 6S. The active capacitive pen 6 also includes a variable capacitance capacitor exhibiting a capacitance corresponding to a pen pressure applied to a pen core (see Japanese Patent Laid-Open No. 2011-186803 and the like).

FIG. 9A shows an example of the control signal from the control circuit of the active capacitive pen 6. During a certain period during which the control signal maintains a high level, as shown in FIG. 9B, the active capacitive pen 6 continuously transmits the transmission signal from the transmission circuit 6S as a burst signal (continuous transmission period in FIG. 9C).

The length of the continuous transmission period is a time length in which the sensor signal processing circuit 200 of the position detecting device 1 can detect a position indicated by the active capacitive pen 6 on the sensor 100, and is for example a time length in which all of the transmitting conductors 11Y and the receiving conductors 12X can be scanned once or more, or preferably a plurality of times or more.

During the continuous transmission period, the control circuit of the active capacitive pen 6 detects a pen pressure applied to the pen core of the active capacitive pen 6 as a detection signal corresponding to the capacitance of the built-in variable capacitance capacitor, and obtains the pen pressure as a 10-bit value (binary code), for example, from the detection signal.

Then, as shown in FIG. 9A, when the continuous transmission period is ended, the control circuit of the active capacitive pen 6 controls the control signal to a high level or a low level in predetermined cycles (Td), and thereby performs amplitude shift keying (ASK) modulation of the transmission signal from the transmission circuit 6S. At this time, a high level is always set in the first of the predetermined cycles (Td), and is used as a start signal in FIG. 9C. This start signal is a timing signal for enabling subsequent data sending out timing to be correctly determined on the position detecting device 1 side. Incidentally, the burst signal can also be used as the timing signal in place of the start signal. Following the start signal, 10-bit pen pressure data is sequentially transmitted. In this case, control is performed so as to set the control signal to a low level and not to send out the transmission signal when the transmission data (binary code) is "0," and so as to set the control signal to a high level and send out the transmission signal when the transmission data (binary code) is "1." FIGS. 9A to 9C represent a case where the pen pressure data to be transmitted is "1010111010." Incidentally, the active capacitive pen 6 sends out data such as the identifying information of the active capacitive pen 6 itself and a battery remaining capacity as an ASK signal or an on-off keying (OOK) signal as in the above after the pen pressure data.

In the pen indication detecting circuit 203 of the position detecting device 1, the control circuit 204 for example first supplies a selecting signal for sequentially selecting the receiving conductors $12X_1$ to $12X_n$ to the selecting circuit 201P, and reads, as a signal level, data output from the AD converting circuit 65 at a time of selection of each of the receiving conductors $12X_1$ to $12X_n$. Then, when none of the signal levels of the receiving conductors $12X_1$ to $12X_n$ reach a predetermined value, the control circuit 204 determines that the active capacitive pen 6 is not on the sensor 100, and repeats control of sequentially selecting the receiving conductors $12X_1$ to $12X_n$.

When a signal having a level equal to or higher than a predetermined value is detected from one of the receiving conductors $12X_1$ to $12X_n$, the control circuit 204 stores the number of the receiving conductor 12X from which the highest signal level is detected and the numbers of a plurality of receiving conductors 12X around the receiving conductor 12X from which the highest signal level is detected. Then, the control circuit 204 controls the selecting circuit 201P to select the transmitting conductors $11Y_1$ to $11Y_m$ sequentially, and reads signal levels from the AD converting circuit 65. At this time, the control circuit 204 stores the number of a transmitting conductor 11Y from which a highest signal level is detected and the numbers of a plurality of transmitting conductors 11Y around the transmitting conductor 11Y from which the highest signal level is detected.

Then, the control circuit 204 detects a position indicated by the active capacitive pen 6 on the sensor 100 from the numbers stored as described above, that is, the number of the receiving conductor 12X from which the highest signal level is detected and the number of the transmitting conductor 11Y from which the highest signal level is detected as well as the numbers of the plurality of receiving conductors 12X around the receiving conductor 12X from which the highest signal level is detected and the plurality of transmitting conductors 11Y around the transmitting conductor 11Y from which the highest signal level is detected.

When the control circuit 204 ends the detection of the signal levels after selecting the last transmitting conductor $Y_m$ by the selecting circuit 201P, the control circuit 204 waits for an end of the continuous transmission period from the active capacitive pen 6. When the control circuit 204 detects the start signal after the end of the continuous transmission period, the control circuit 204 performs an operation of reading data such as pen pressure data, and thereby reads the data.

[Effects of the First Embodiment]

As described above, the sensor signal processing circuit 200 of the position detecting device 1 according to the above-described embodiment in the finger touch detecting period TF sequentially selects the second conductors (receiving conductors) forming the sensor 100, and detects whether or not the finger 5 is in proximity to the sensor 100 by the finger proximity detecting function of the first signal detecting circuit that detects whether or not the finger 5 is in proximity to the sensor 100 on the basis of a change in capacitance (self-capacitance) between the selected second conductor (receiving conductor) and the ground.

Therefore, the proximity of the finger 5 to the sensor 100 can be detected with high sensitivity as compared with a case where the proximity of the finger 5 to the sensor 100 is detected on the basis of a change in capacitance (mutual capacitance) in the regions (cross points) formed between the first conductors and the second conductors.

Then, when it is determined on the basis of a result of comparison by a comparing circuit that the finger 5 has come into further proximity to the sensor 100 to a predetermined distance from the sensor 100, the finger touch position detecting function is performed which detects a position indicated by the finger 5 on the sensor 100 on the basis of a change in capacitance (mutual capacitance) in the regions (cross points) formed between the first conductors and the second conductors.

Thus, the sensor signal processing circuit 200 is configured not to operate the finger touch position detecting function when the finger 5 has not come into proximity to the sensor 100 to a predetermined distance from the sensor 100 but to operate the finger touch position detecting function when the finger 5 has come into proximity to the sensor 100 to the predetermined distance from the sensor 100. A finger touch position can therefore be detected efficiently. In addition, instead of detecting the capacitances (mutual capacitances) of an enormous number of cross points formed by the points of intersection of the transmitting conductors 11Y and the receiving conductors 12X, it suffices only to detect the self-capacitance of each of the receiving conductors 12X, which are fewer than the number of cross points. Therefore, current consumption is reduced, and a power saving is achieved. Furthermore, because the processing of the finger proximity detecting function is performed at a slower processing speed than that of the finger touch position detecting function, the power consumption of the sensor signal processing circuit 200 can be reduced also in this respect.

In addition, in the above-described first embodiment, the finger proximity detecting function switches the switch circuits 31a and 31e and the gate circuit 31b in the signal processing circuit 310 that is connected to the receiving conductor 12X and which performs the finger touch position detecting function, and detects a change in capacitance between the conductor and the ground. Hence, a circuit configuration for realizing the first detecting circuit of the finger proximity detecting function and the circuit of the finger touch position detecting function is simplified. Then, because the finger proximity detecting function is performed without transmission signals being supplied to the sensor 100, the processing is correspondingly simplified, and the power consumption of the sensor signal processing circuit 200 can be correspondingly reduced.

[Modifications of the First Embodiment]

Figure 10:
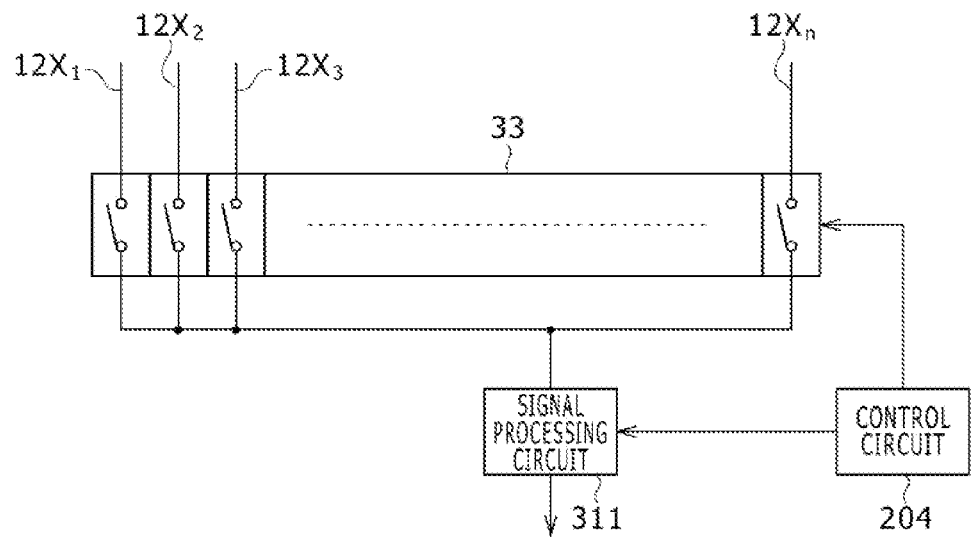
FIG. 10 is a diagram of assistance in explaining a modification of the first embodiment of the sensor signal processing circuit according to the present disclosure.

In the foregoing embodiment, the finger touch detecting circuit 202 is provided with the signal processing circuits 310 for the respective receiving conductors $12X_1$ to $12X_n$, and is thus configured to be able to perform finger proximity detection processing and finger touch detection processing for all of the receiving conductors $12X_1$ to $12X_n$ simultaneously. However, the signal processing circuits 310 do not have to be provided to the respective receiving conductors $12X_1$ to $12X_n$. For example, as shown in FIG. 10, one common signal processing circuit 311 may be provided to the receiving conductors $12X_1$ to $12X_n$, and a conductor selecting circuit 33 may be provided between the one signal processing circuit 311 and the receiving conductors $12X_1$ to $12X_n$, so that the signal processing circuit 311 processes a signal from a receiving conductor 12X selected from among the receiving conductors $12X_1$ to $12X_n$ by the conductor selecting circuit 33.

The signal processing circuit 311 has an exactly similar configuration to that of the signal processing circuit 310. A selection control signal from the control circuit 204 controls the selection of the conductor selecting circuit 33. In this case, the receiving conductors 12X may be sequentially selected one by one, or a plurality of receiving conductors 12X may be selected simultaneously.

In this case, at a time of finger proximity detection processing, when the conductor selecting circuit 33 selects all of the receiving conductors $12X_1$ to $12X_n$, a state of proximity of the finger 5 to the sensor 100 can be detected by detecting a change in the whole of capacitances between the respective receiving conductors $12X_1$ to $12X_n$ and the ground (capacitances connected in parallel with each other). When groups of a plurality of receiving conductors 12X are selected group by group, a state of proximity of the finger 5 to the sensor 100 can be detected by detecting a change in a combined capacitance obtained by connecting capacitances between the plurality of respective receiving conductors 12X and the ground in parallel with each other.

Incidentally, also at a time of finger touch detection processing, a finger touch position may be detected by groups of a plurality of receiving conductors 12X. Ultimately, however, the conductor selecting circuit 33 is controlled so as to select the receiving conductors 12X one by one, so that a detailed finger touch position is detected.

Incidentally, when the conductor selecting circuit 33 selects the receiving conductors 12X one by one, the conductor selecting circuit 33 may select the receiving conductors 12X while skipping every other receiving conductor 12X or every other group of a plurality of receiving conductors 12X, rather than selecting all of the receiving conductors 12X sequentially. In addition, also when the conductor selecting circuit 33 selects groups of a plurality of receiving conductors 12X on a group-by-group basis, the conductor selecting circuit 33 may select groups of a plurality of receiving conductors 12X on a group-by-group basis which groups are formed by skipping every other receiving conductor 12X or every other group of a plurality of receiving conductors 12X.

Figure 11:
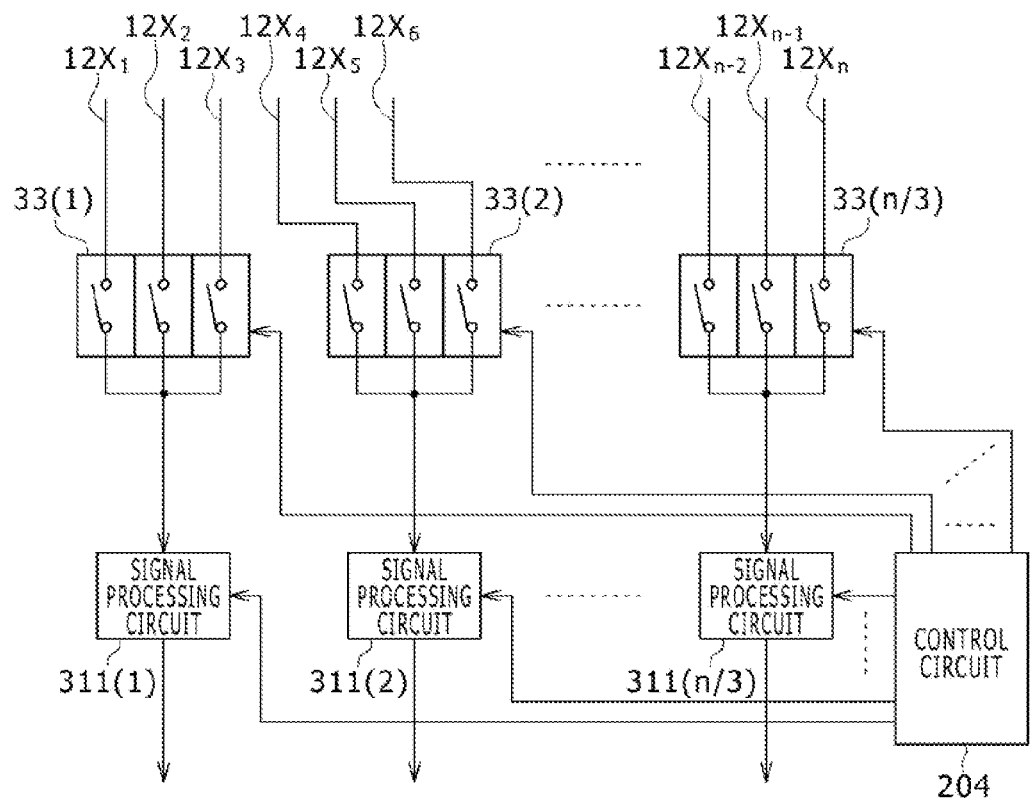
FIG. 11 is a diagram of assistance in explaining a modification of the first embodiment of the sensor signal processing circuit according to the present disclosure.

In addition, as shown in FIG. 11, the receiving conductors $12X_1$ to $12X_n$ may be bundled in groups of a plurality of receiving conductors 12X, or in groups of three in the example of FIG. 11, and the bundled groups of a plurality of receiving conductors 12X may be respectively provided with signal processing circuits 311(1), 311(2), . . . , and 311(n/3) having a configuration similar to that of the above-described signal processing circuit 310, and respectively provided with conductor selecting circuits 33(1), 33(2), . . . , and 33(n/3).

In this case, as shown in FIG. 11, the respective output terminals of the conductor selecting circuits 33(1), 33(2), . . . , and 33(n/3) are connected to the input terminals of the signal processing circuits 311(1), 311(2), . . . , and 311(n/3).

Then, at a time of processing of the finger proximity detecting function, the control circuit 204 makes the conductor selecting circuits 33(1), 33(2), . . . , and 33(n/3) each select a group of three receiving conductors 12X simultaneously, and makes the signal processing circuits 311(1), 311(2), . . . , and 311(n/3) each perform finger proximity detection processing for the group of the three receiving conductors 12X as with the above-described signal processing circuit 310.

Then, at a time of processing of the finger touch detecting function, the control circuit 204 performs finger touch position detection processing by operating only the signal processing circuit 311 that has detected by the finger proximity processing that a measured value of a signal corresponding to the self-capacitances of the receiving conductors 12X exceeds a threshold value, and making the corresponding conductor selecting circuit 33 select the receiving conductors 12X one by one.

Thus, in the example of FIG. 11, the finger proximity detection processing and the finger touch detection processing can be performed in each of the bundled units of a plurality of receiving conductors 12X.

Incidentally, in the foregoing embodiment, the sensor signal processing circuit 200 includes the position calculating circuit 32, and outputs position information on a position indicated by the indicator such as the finger 5 or the stylus such as the active capacitive pen 6 to the computer (host computer) of the electronic apparatus or a personal computer. However, the control circuit 204 may be configured to output information on a result of processing of a signal obtained from each conductor, for example the output of the signal processing circuit 31 in FIG. 5 or output from the AD converting circuit 65 in FIG. 8 to the computer (host computer) of the electronic apparatus or the personal computer, and make position calculation processing performed in these computers.

In addition, though processing of detecting the proximity of the active capacitive pen 6 to the sensor 100 is not performed in the foregoing embodiment, the processing of detecting the proximity of the stylus such as the active capacitive pen 6 to the sensor 100 can be performed by using processing similar to the above-described finger proximity detecting function processing when the casing of the stylus is formed of a conductive material. That is, the proximity of the stylus to the sensor 100 can be detected in the finger touch detecting period TF (first detecting period).

In this case, assuming for example that the stylus is held with a hand and brought closer to the sensor 100, both of the hand and the stylus are detected (position above the sensor 100 and a hovering proximity state) in the finger touch detecting period TF (first detecting period), and a position indicated by the stylus is detected in the pen indication detecting period TP (second detecting period). Then, it is assumed that both of detection outputs are similar to each other.

In consideration of this, when it is recognized that a result of detection of a position indicated by the indicator (the stylus and the finger in this case) and a state of proximity of the indicator in the finger touch detecting period TF (first detecting period) and a result of detection of a position indicated by the stylus such as the active capacitive pen 6 in the pen indication detecting period TP (second detecting period) are similar to each other, a predetermined state flag for distinguishing the result of detection of the indicator in the first detecting period and the result of detection of the stylus in the second detecting period is generated.

Then, when it is recognized that the result of detection of the position indicated by the indicator in the finger touch detecting period TF (first detecting period) and the result of detection of the position indicated by the stylus in the pen indication detecting period TP are similar to each other, the result of detection of the position indicated by the stylus in the pen indication detecting period TP (second detecting period) is processed preferentially.

[Second Embodiment]

In the foregoing first embodiment, the finger proximity detection processing detects a finger proximity state by detecting capacitances (self-capacitances) between the receiving conductors (second conductors) of the sensor 100 and the ground. However, the finger proximity detection processing may obtain capacitances (self-capacitances) between the transmitting conductors (first conductors) and the ground. A second embodiment to be described in the following is configured to be able to detect a state of proximity of the finger 5 to the sensor 100 by detecting a change in capacitance (self-capacitance) between a transmitting conductor and the ground using a transmission signal.

<An Example of Configuration of a Sensor Signal Processing Circuit 200A of a Position Detecting Device 1A According to a Second Embodiment>

Figure 12:
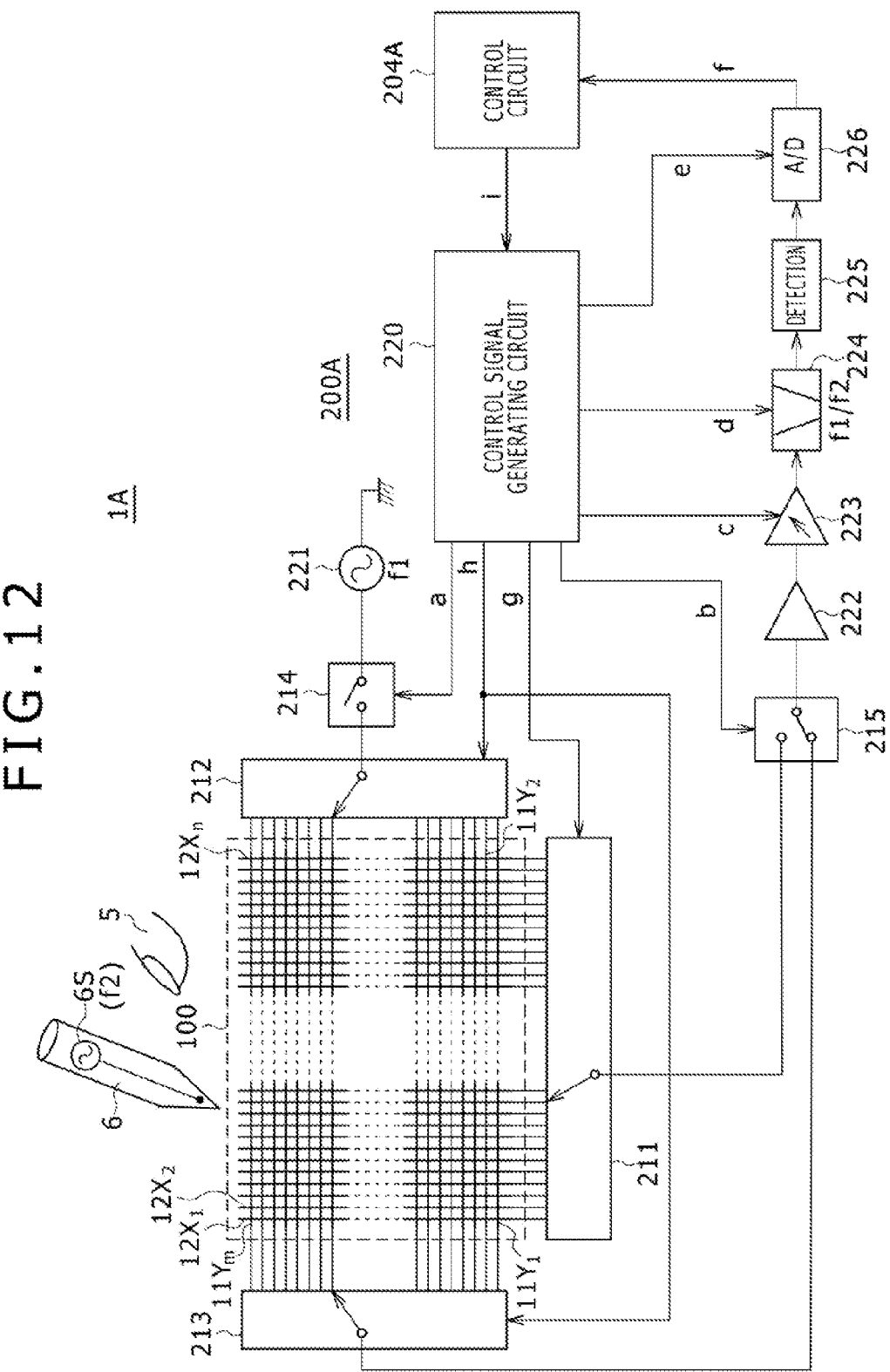
FIG. 12 is a block diagram showing an example of configuration of a second embodiment of the sensor signal processing circuit according to the present disclosure.

FIG. 12 is a diagram showing an example of configuration of a position detecting device 1A including an example of configuration of a sensor signal processing circuit 200A according to a second embodiment. In FIG. 12, the same parts as in the position detecting device 1 according to the first embodiment are identified by the same reference symbols, and detailed description thereof will be omitted. That is, the position detecting device 1A in the second embodiment includes a sensor 100 having an identical configuration to that of the position detecting device 1 according to the first embodiment. The sensor signal processing circuit 200A according to the second embodiment is connected to the sensor 100. In addition, in the second embodiment, the sensor signal processing circuit 200A does not separately include a finger touch detecting circuit and a pen indication detecting circuit, but has a configuration of a finger touch/pen indication detecting circuit that changes functions between a finger touch detecting circuit and a pen indication detecting circuit according to switching control of a control circuit 204A.

As shown in FIG. 12, the sensor signal processing circuit 200A in the present example includes an X-conductor selecting circuit 211, Y-conductor selecting circuits 212 and 213, switching circuits 214 and 215, an oscillator 221, an amplifying circuit 222, a gain control circuit 223, a band-pass filter 224, a detecting circuit 225, an AD converting circuit 226, and a control signal generating circuit 220. The sensor signal processing circuit 200A also includes the control circuit 204A. The control circuit 204A is different from the control circuit 204 only in terms of processing contents (software), and is similar as hardware to the control circuit 204.

The X-conductor selecting circuit 211, the Y-conductor selecting circuits 212 and 213, and the switching circuits 214 and 215 correspond to the above-described multiplexer 201 in FIG. 2. The oscillator 221, the amplifying circuit 222, the gain control circuit 223, the band-pass filter 224, the detecting circuit 225, the AD converting circuit 226, and the control signal generating circuit 220 constitute the finger touch/pen indication detecting circuit according to the second embodiment.

The control signal generating circuit 220 receives a control signal from the control circuit 204A. The control signal generating circuit 220 supplies switching control signals to the X-conductor selecting circuit 211, the Y-conductor selecting circuits 212 and 213, and the switching circuits 214 and 215, and supplies control signals to the above-described parts constituting the finger touch/pen indication detecting circuit.

The X-conductor selecting circuit 211 selects one second conductor 12X from a second conductor group 12 according to a selection control signal g from the control signal generating circuit 220. The Y-conductor selecting circuits 212 and 213 are selection-controlled in such a manner as to be operatively associated with each other by a selection control signal h from the control signal generating circuit 220, and simultaneously select the same first conductor 11Y from a first conductor group 11. Incidentally, also in the second embodiment, at a time of a finger touch position detecting function, the first conductors 11Y receive a signal from the oscillator 221, and transmit the signal to the second conductors 12X via capacitances (mutual capacitances). Thus, the first conductors 11Y constitute transmitting conductors, and the second conductors 12X constitute receiving conductors. However, in the following description, for convenience, the first conductors 11Y will be referred to as Y-conductors 11Y, and the second conductors 12X will be referred to as X-conductors 12X.

The oscillator 221 is an oscillator configured to supply an oscillating signal having a frequency f1 as a driving signal to the Y-conductors 11Y in the finger touch detecting period TF of the sensor signal processing circuit 200A. The switching circuit 214 performs switching as to whether or not to connect a Y-conductor 11Y selected by the Y-conductor selecting circuit 212 to the oscillator 221 according to a selection control signal a from the control signal generating circuit 220.

The switching circuit 215 performs switching so as to connect one of the Y-conductor 11Y selected by the Y-conductor selecting circuit 213 and the X-conductor 12X selected by the X-conductor selecting circuit 211 to an input terminal of the amplifying circuit 222 according to a selection control signal b from the control signal generating circuit 220.

An output of the amplifying circuit 222 is connected to the gain control circuit 223. The gain control circuit 223 gain-controls the output of the amplifying circuit 222 according to a control signal c from the control signal generating circuit 220, and thus sets the output of the amplifying circuit 222 to be an output signal having an appropriate level.

The band-pass filter 224 is a band-pass filter having a predetermined bandwidth with the frequency f1 or a frequency f2 as a center thereof. The center frequency of the band-pass filter 224 is changed by a control signal d from the control signal generating circuit 220. The center frequency is switched to the oscillation frequency f1 of the oscillator 221 in the finger touch detecting period, and the center frequency is switched to the frequency f2 of a signal from an active capacitive pen 6 in the pen indication detecting period TP.

The output signal of the band-pass filter 224 is detected by the detecting circuit 225. The detection output of the detecting circuit 225 is supplied to the AD converting circuit 226 to be converted into a digital value by the AD converting circuit 226 on the basis of a control signal e from the control signal generating circuit 220. Digital data f from the AD converting circuit 226 is read and processed by the control circuit 204A.

A microprocessor constituting the control circuit 204A internally includes a ROM and a random access memory (RAM), and operates according to a program stored in the ROM. The control circuit 204A controls the control signal generating circuit 220 by outputting a control signal i so that the control signal generating circuit 220 outputs the control signals a to e and g and h in predetermined timing. Hence, the control circuit 204A always grasps and manages the switching states of the switching circuits 214 and 215 and the selection states of the X-conductor selecting circuit 211 and the Y-conductor selecting circuits 212 and 213 according to the control signal generating circuit 220.

The operation of the sensor signal processing circuit 200A of the position detecting device 1A configured as described above will next be described. Also in the second embodiment, as in the first embodiment, the sensor signal processing circuit 200A performs processing in the finger touch detecting period TF and processing in the pen indication detecting period TP on a time-division basis. In the finger touch detecting period TF, the finger proximity detecting function and the finger touch position detecting function are performed as in the flowchart shown in FIG. 4. In addition, the sensor signal processing circuit 200A performs, as a second detecting circuit, processing of detecting a position indicated by the active capacitive pen 6 in the pen indication detecting period TP.

<At a Time of Performance of the Finger Proximity Detecting Function in the Finger Touch Detecting Period TF>

At a time of performance of the finger proximity detecting function in the finger touch detecting period TF, the control signal generating circuit 220 switches the switching circuit 214 so as to supply the oscillating signal from the oscillator 221 to one Y-conductor 11Y selected by the Y-conductor selecting circuit 212. The control signal generating circuit 220 also switches the switching circuit 215 so as to connect the Y-conductor 11Y selected by the Y-conductor selecting circuit 213 to the amplifying circuit 222.

Then, the control signal generating circuit 220 controls the Y-conductor selecting circuit 212 and the Y-conductor selecting circuit 213 so as to select the same Y-conductor 11Y in synchronism with each other, and sequentially select the Y-conductors 11Y one by one. At this time, the control signal generating circuit 220 does not perform selection control of the X-conductor selecting circuit 211. Then, the control signal generating circuit 220 switches the center frequency of the band-pass filter 224 to the frequency f1.

Therefore, the oscillating signal from the oscillator 221 is supplied through the switching circuit 214 to the Y-conductor 11Y selected by the Y-conductor selecting circuit 212. This oscillating signal is obtained as a received signal from the Y-conductor selecting circuit 213, and is supplied through the switching circuit 215 to the amplifying circuit 222. Then, the received signal is amplified by the amplifying circuit 222, extracted after being supplied via the gain control circuit 223 to the band-pass filter 224 whose center frequency has been switched to f1, and detected by the detecting circuit 225. A signal corresponding to the level of the received signal is obtained from the detecting circuit 225. The AD converting circuit 226 then converts the signal from the detecting circuit 225 into digital data f. The digital data f is supplied to the control circuit 204A.

When the finger 5 is not in proximity to the sensor 100, capacitances (self-capacitances) between all of the respective Y-conductors 11Y and the ground are substantially the same. When the finger 5 is in proximity to the sensor 100, the capacitance (self-capacitance) between the Y-conductor 11Y to which the finger 5 is in proximity and the ground is in a state of being connected in parallel with a capacitance between the human body and the ground, and is thus changed. Hence, the level of the received signal from the Y-conductor 11Y selected by the Y-conductor selecting circuit 213 is lowered when the finger 5 is in proximity to the sensor 100.

The control circuit 204A compares, with a predetermined threshold value, the level of the received signal (digital data f) which level corresponds to the change in the capacitance (self-capacitance) between the Y-conductor 11Y to which the finger 5 is in proximity and the ground, and detects that the finger 5 is in proximity to the sensor 100 when detecting that the level of the received signal is lower than the predetermined threshold value. Incidentally, the control circuit 204A detects from the level of the received signal that the finger 5 is in proximity to the sensor 100, and detects that the finger 5 has come into further proximity to the sensor 100 by comparing the signal level with the predetermined threshold value. When the control circuit 204A detects that the finger 5 has come into further proximity to the sensor 100 on the basis of a result of the comparison of the signal level with the predetermined threshold value, the control circuit 204A switches processing operation in the finger touch detecting period TF to a state of performing the finger touch position detecting function.

<At a Time of Performance of the Finger Touch Position Detecting Function in the Finger Touch Detecting Period TF>

At a time of performance of the finger touch position detecting function in the finger touch detecting period TF, the control signal generating circuit 220 switches the switching circuit 214 so as to supply the oscillating signal from the oscillator 221 to one Y-conductor 11Y selected by the Y-conductor selecting circuit 212, and switches the switching circuit 215 so as to connect the X-conductor 12X selected by the X-conductor selecting circuit 211 to the amplifying circuit 222.

Then, the control signal generating circuit 220 controls the Y-conductor selecting circuit 212 so as to select the Y-conductors 11Y sequentially one by one, and controls the X-conductor selecting circuit 211 so as to select all of the X-conductors 12X sequentially in a period of selecting one Y-conductor 11Y. Then, the control signal generating circuit 220 holds the center frequency of the band-pass filter 224 as it is at the frequency f1. However, in the present embodiment, the control circuit 204A does not set all of the Y-conductors 11Y as objects to be selected by the Y-conductor selecting circuit 212, but sets, as an object to be selected, only the Y-conductor 11Y detected as a Y-conductor 11Y to which the finger 5 is in proximity in the above-described finger proximity detecting function processing.

Then, the oscillating signal from the oscillator 221 is transmitted through a capacitance (mutual capacitance) between the Y-conductor 11Y being selected by the Y-conductor selecting circuit 212 and the X-conductor 12X being selected by the X-conductor selecting circuit 211 to the X-conductor 12X, and is obtained as a received signal from the X-conductor selecting circuit 211.

Then, the received signal amplified by the amplifying circuit 222 is extracted after being supplied via the gain control circuit 223 to the band-pass filter 224 whose center frequency has been switched to f1, detected by the detecting circuit 225, and thereafter converted into digital data f by the AD converting circuit 226. The digital data f is supplied to the control circuit 204A.

At this time, as described in the first embodiment, the capacitance (mutual capacitance) between the Y-conductor 11Y and the X-conductor 12X at the position touched by the finger 5 is changed as compared with the capacitances (mutual capacitances) between the Y-conductors 11Y and the X-conductors 12X at the positions not touched by the finger 5, and the level of the received signal from the X-conductor 12X at the position touched by the finger 5 is lowered. Therefore, when signal levels at all of the points of intersection of the X-conductors 12X and the Y-conductors 11Y without the presence of the finger 5 are obtained in advance, a finger touch position can be determined from the position where the level of the received signal is lower than the signal level obtained in advance.

The control circuit 204A recognizes the position of a cross point where the Y-conductor 11Y and the X-conductor 12X intersect each other on the basis of the selection state of the Y-conductor selecting circuit 212 and the selection state of the X-conductor selecting circuit 211. The control circuit 204A detects the finger touch position by detecting a change as described above in the capacitance (mutual capacitance) between the Y-conductor 11Y and the X-conductor 12X at each cross point.

Incidentally, also in the second embodiment, as in the first embodiment, as for processing speed in the finger touch detecting period TF, processing speed at the time of the finger proximity detecting function is a low speed of about 50 pulses per second (pps), for example, and processing speed at the time of the finger touch position detecting function is faster than the processing speed at the time of the finger proximity detecting function, and is a high speed of about 100 pps, for example.

Incidentally, at the time of the finger proximity detecting function in the finger touch detecting period TF described above, the Y-conductor selecting circuits 212 and 213 sequentially select all of the Y-conductors 11Y one by one. However, the Y-conductor selecting circuits 212 and 213 may select the Y-conductors 11Y while skipping every other Y-conductor 11Y or every other group of a plurality of Y-conductors 11Y. In addition, at the time of the finger proximity detecting function in the finger touch detecting period TF, the Y-conductor selecting circuits 212 and 213 may select groups of a plurality of Y-conductors 11Y while skipping every other Y-conductor 11Y or every other group of a plurality of Y-conductors 11Y.

<Operation in the Pen Indication Detecting Period TP (Operation of a Third Detecting Circuit)>

At a time of performance of processing in the pen indication detecting period TP, the control signal generating circuit 220 performs control so as to switch the center frequency of the band-pass filter 224 to the frequency f2. Then, the control signal generating circuit 220 controls the X-conductor selecting circuit 211 to sequentially select the X-conductors 12X one by one, and switches the switching circuit 215 so as to connect a X-conductor 12X selected by the X-conductor selecting circuit 211 to the amplifying circuit 222 via the switching circuit 215. At this time, the switching circuit 214 is left as it is in an off state.

When the active capacitive pen 6 indicates a position on the sensor 100 in this state, a signal having the frequency f2 from the active capacitive pen 6 is transmitted to the AD converting circuit 226 via the X-conductor 12X at the position indicated by the active capacitive pen 6 and the X-conductor selecting circuit 211, and converted into digital data fin the AD converting circuit 226. The digital data f is supplied to the control circuit 204A. The control circuit 204A detects the position of the X-conductor 12X indicated by the active capacitive pen 6 on the sensor 100 from the digital data f and the selection state in the X-conductor selecting circuit 211, and retains the position of the X-conductor 12X as the X-coordinate of the position indicated by the active capacitive pen 6.

Next, the control signal generating circuit 220 switches the switching circuit 215 so as to connect one Y-conductor 11Y selected by the Y-conductor selecting circuit 213 to the amplifying circuit 222. Then, the control signal generating circuit 220 controls the Y-conductor selecting circuit 213 so as to sequentially select the Y-conductors 11Y one by one.

Then, the signal having the frequency f2 from the active capacitive pen 6 is transmitted to the AD converting circuit 226 via the Y-conductor 11Y at the position indicated by the active capacitive pen 6 and the Y-conductor selecting circuit 213, and converted into digital data fin the AD converting circuit 226. The digital data f is supplied to the control circuit 204A.

The control circuit 204A detects the position of the Y-conductor 11Y indicated by the active capacitive pen 6 on the sensor 100 from the digital data f and the selection state in the Y-conductor selecting circuit 213, and retains the position of the Y-conductor 11Y as the Y-coordinate of the position indicated by the active capacitive pen 6. The control circuit 204A then outputs the retained X-coordinate and the retained Y-coordinate as the coordinate values of the position indicated by the active capacitive pen 6.

[Effects of the Second Embodiment]

The second embodiment provides actions and effects similar to the actions and effects of the foregoing first embodiment, and also provides the following effect. In the second embodiment, the configuration of the sensor signal processing circuit 200A is used for the functions of both of a finger touch detecting circuit and a pen indication detecting circuit, and the control signal generating circuit 220 performs switching control of the switching circuits 214 and 215, selection control of the X-conductor selecting circuit 211 and the Y-conductor selecting circuits 212 and 213, and switching control of the pass frequency band of the band-pass filter 224, whereby switching between the finger touch detecting period TF and the pen indication detecting period TP can be performed. Thus, because of the configuration used for the functions of both of a finger touch detecting circuit and a pen indication detecting circuit, the second embodiment produces an effect of simplifying the configuration of the sensor signal processing circuit 200A.

[Third Embodiment]

Figure 13B:
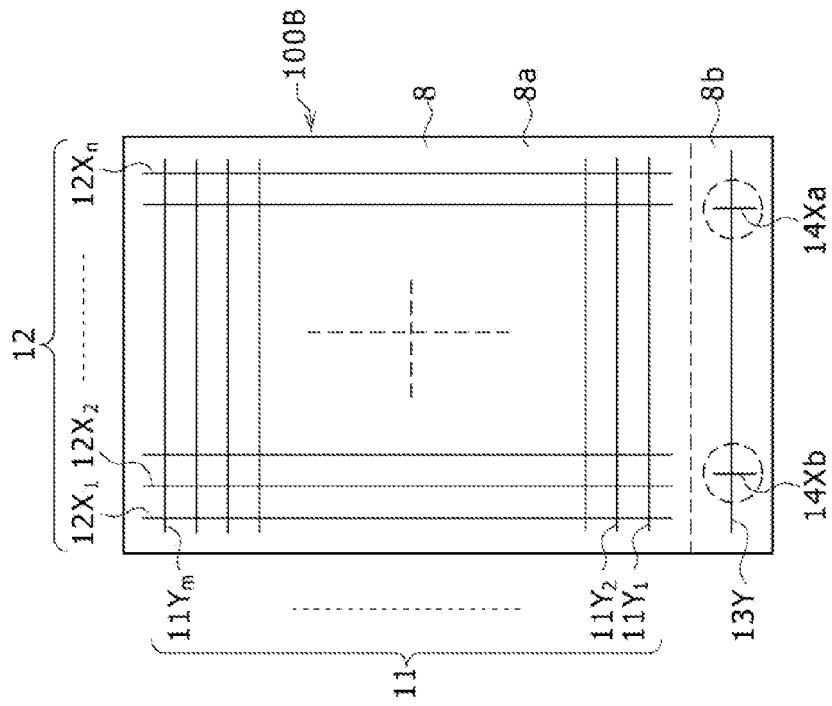
FIGS. 13A and 13B are diagrams of assistance in explaining an example of configuration of a third embodiment of the sensor signal processing circuit according to the present disclosure.
Figure 13A:
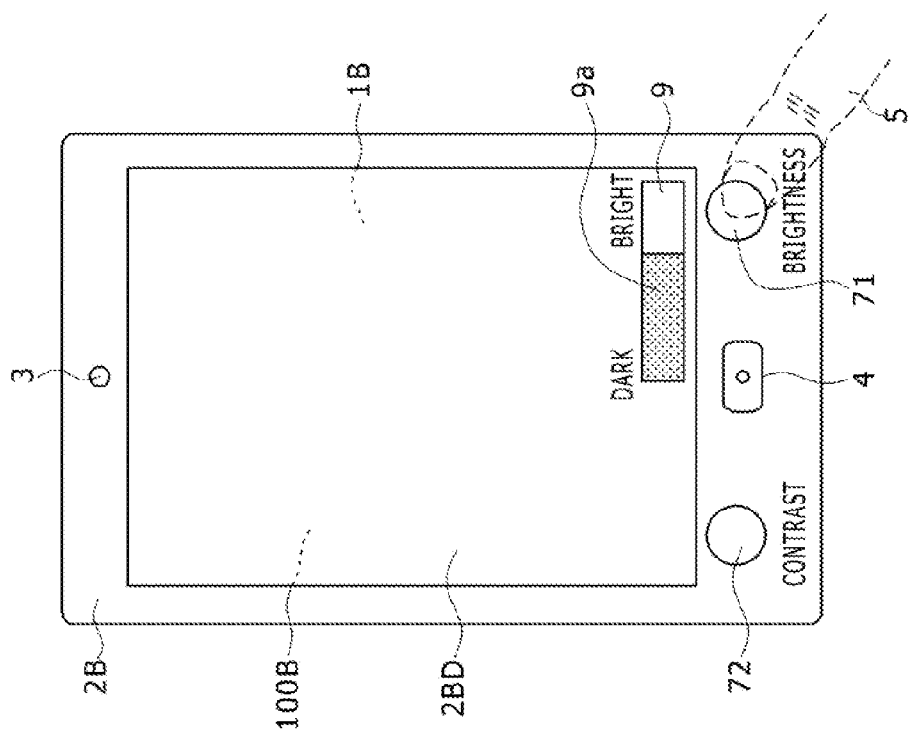

FIG. 13A shows an external appearance of an electronic apparatus 2B including a position detecting device 1B to which a sensor signal processing circuit according to a third embodiment of the present disclosure is applied. A position detecting sensor 100B forming the position detecting device 1B is disposed on a front surface portion of a display screen 2BD of the electronic apparatus 2B. FIG. 13B is a diagram showing an example of the position detecting sensor 100B.

As shown in FIG. 13A, in the electronic apparatus 2B in the present example, operating buttons 71 and 72 for adjusting the brightness and contrast of the display screen 2BD are provided below the display screen 2BD. In the present example, a state of proximity of an indicator such as a finger 5 to the operating buttons 71 and 72 and an operation of touching the operating buttons 71 and 72 by the indicator can be detected through the position detecting sensor 100B.

Specifically, a sensor substrate 8 of the position detecting sensor 100B in the present example has a size larger than the whole region of the display screen 2BD and extends over a part where the operating buttons 71 and 72 are provided below the display screen 2BD. As in the foregoing embodiments, a sensor of a cross point configuration formed by a first conductor group 11 including a plurality of first conductors $11Y_1, 11Y_2, \ldots,$ and $11Y_m$ and a second conductor group 12 including a plurality of second conductors $12X_1, 12X_2, \ldots,$ and $12X_n$ is formed in a region 8a corresponding to the whole region of the display screen 2BD within the sensor substrate 8.

A sensor part configured to detect button operations is formed in a region 8b of the sensor substrate 8 which region 8b corresponds to the operating buttons 71 and 72 below the display screen 2BD. One conductor 13Y extending in a horizontal direction (X-axis direction) is formed on the back surface of the region 8b of the sensor part configured to detect button operations in the sensor substrate 8, and two conductors 14Xa and 14Xb extending in a vertical direction (Y-axis direction) are formed on the front surface of the region 8b. In this case, as shown in FIG. 13B, the position of a point of intersection of the conductor 13Y and the conductor 14Xa is set directly under the central position of the operating button 71, and the position of a point of intersection of the conductor 13Y and the conductor 14Xb is set directly under the central position of the operating button 72.

The sensor of the cross point configuration formed in the region 8a of the sensor substrate 8 has a configuration exactly similar to those of the foregoing embodiments and performs processing operation similar to that of the foregoing embodiments, and therefore description thereof will be omitted in the following.

In the third embodiment, a button operating detecting circuit (not shown) is connected to the conductor 13Y and the conductors 14Xa and 14Xb formed in the region 8b of the sensor substrate 8, and the button operating detecting circuit is configured to be able to detect a state of proximity of the indicator to the operating buttons 71 and 72 and detect the touching of the operating buttons 71 and 72 by the indicator.

That is, the button operating detecting circuit detects a state of proximity of the indicator such as the finger 5 to the operating button 71 on the basis of a capacitance (self-capacitance) between the conductor 14X*a* and the ground as in the foregoing embodiments, and detects a state of proximity of the indicator such as the finger 5 to the operating button 72 on the basis of a capacitance (self-capacitance) between the conductor 14X*b* and the ground as in the foregoing embodiments.

When the button operating detecting circuit compares, with a predetermined value, a detection result based on a change in the capacitance (self-capacitance) between the conductor 14X*a* and the ground or the capacitance (self-capacitance) between the conductor 14X*b* and the ground, and detects from a result of the comparison that the indicator is at a position closer than a predetermined distance from the front surface of the position detecting sensor 100B, the button operating detecting circuit starts to supply a transmission signal to the conductor 13Y. Then, the button operating detecting circuit detects an operation of touching the point of intersection of the conductor 13Y and the conductor 14X*a* or the conductor 13Y and the conductor 14X*b* by the indicator, that is, an operation of touching the operating button 71 or 72 by the indicator on the basis of a result of receiving the alternating-current signal through a capacitance (mutual capacitance) between the conductor 13Y and the conductor 14X*a* or 14X*b*.

Using a result of the detection of the indicator for the operating buttons 71 and 72 by the button operating detecting circuit as described above, the electronic apparatus 2B realizes functions as described in the following.

The operating button 71 is assigned adjustment of brightness of the display screen 2BD in the present example, and the operating button 72 is assigned adjustment of contrast of an image displayed on the display screen 2BD in the present example.

Then, when the finger 5 of a user, for example, comes into proximity to the operating button 71 as indicated by a dotted line in FIG. 13A, for example, a control section of the electronic apparatus 2B displays a brightness adjustment display part 9 on a lower part of the display screen 2BD, as shown in FIG. 13A. In the brightness adjustment display part 9, display control is performed such that the brighter the display screen 2BD is adjusted to be, the longer the length of a brightness adjustment bar 9*a* shown filled in in FIG. 13A becomes.

In the present example, when the user touches the operating button 71 with the finger 5 once or a plurality of times, the length of the adjustment bar 9*a* is increased by a length corresponding to the number of times of touching the operating button 71. That is, the brightness of the screen can be adjusted according to the number of times that the user touches the operating button 71. The contrast corresponding to the operating button 72 can be adjusted in a similar manner.

As described above, in the third embodiment, when the indicator such as the finger 5 comes into proximity to the operating button 71 or the operating button 72 in a hovering state, the proximity of the indicator is detected on the basis of a change in capacitance (self-capacitance) between the conductor 14X*a* or 14X*b* and the ground, and the adjustment display for the function associated with the operating button 71 or the operating button 72 to which the indicator is detected being in proximity is made on the display screen 2BD. Then, when the indicator comes into further proximity to the operating button 71 or 72, in the present example, the touching of the operating button 71 or the operating button 72 by the indicator is detected by supplying a signal to the conductor 13Y and detecting the signal through the capacitance (mutual capacitance) between the conductor 13Y and the conductor 14X*a* or 14X*b*.

In the present embodiment, the display information (adjustment display parts) for the functions assigned to the operating buttons 71 and 72 is displayed on the display screen 2BD on the basis of a state of proximity of the indicator to the operating buttons 71 and 72, and is set in a non-display state when unnecessary. Therefore, the display screen 2BD can be used efficiently. Then, adjustments with regard to the functions assigned to the operating buttons 71 and 72 can be made by operations of touching the operating buttons 71 and 72 by the indicator.

As described above, according to the third embodiment, with a simple constitution in which a conductor made to intersect one conductor for each operating button is disposed, proximity to the operating button can be detected on the basis of the capacitance (self-capacitance) between the one intersected conductor and the ground, and the touching of the operating button 71 or 72 can be detected by detecting a signal through the capacitance (mutual capacitance) between the two conductors made to intersect each other. Hence, an effect is produced in that display of an adjustment display part and adjustment in the adjustment display part can be made with a simple constitution.

Incidentally, in the example of FIGS. 13A and 13B, the region 8*b* is provided in the sensor substrate 8 in addition to the region 8*a*, and the sensor part configured to detect button operations is formed in the region 8*b*. However, the sensor part configured to detect button operations in the region 8*b* of the sensor substrate 8 may be formed on another substrate.

In addition, it is needless to say that the number of operating buttons in the sensor part configured to detect button operations is not limited to two as in the above-described example, but may be one, or three or more.

[Other Embodiments or Modifications]

Incidentally, it is needless to say that the method for detecting a change in capacitance (self-capacitance) between a conductor and the ground to detect a state of proximity of the finger 5 to the sensor 100 is not limited to the method described in the first embodiment and the second embodiment described above, but various methods can be used as the detecting method.

In addition, in the first embodiment and the second embodiment described above, the self-capacitances are measured and switching is performed to the finger touch detection processing according to a result of the measurement only in the finger touch detecting period TF. However, also in the pen indication detecting period TP, similarly, pen proximity detection may be performed which detects a state of proximity of the active capacitive pen 6 to the sensor 100, and processing of detecting a pen indication position may be performed when a state of proximity of the active capacitive pen 6 to the sensor 100 is detected as a result of the pen proximity detection.

In addition, in the above-described embodiment, a finger touch position is detected on the basis of capacitances (mutual capacitances) of cross points formed between a receiving conductor recognized by the finger proximity detecting function as a receiving conductor to which the finger is in proximity or receiving conductors on the periphery of the receiving conductor recognized by the finger proximity detecting function as a receiving conductor to which the finger is in proximity and all of the transmitting conductors. However, a finger touch position may be detected by supplying a transmission signal to all of the transmitting conductors simultaneously, and receiving the signal in all of the receiving conductors 12X simultaneously. Particularly when a spread code is used as the transmission signal, for example, multi-touch in the entire area can be detected by the simultaneous transmission and the simultaneous reception.

In addition, in the first embodiment and the second embodiment described above, the indicator detected by the finger touch detecting circuit 202 in the sensor signal processing circuit 200 and the sensor signal processing circuit 200A of the position detecting devices on the basis of a change in capacitance is a finger, but is not limited to fingers. For example, a so-called passive capacitive pen having a conductor formed as the casing of the pen can also be used as the indicator, of course.

It is to be noted that while the phrase "self-capacitance measurement" is used in the description of the above-described present disclosure, the phrase "self-capacitance measurement" does not mean processing intended to obtain the self-capacitance Cx itself of a first conductor or a second conductor of the sensor, of course.

It is to be noted that the embodiments of the present disclosure are not limited to the foregoing embodiments, and that various changes can be made without departing from the spirit of the present disclosure.

What is claimed is:

1. A sensor signal processing circuit connected to a sensor, the sensor including a plurality of first conductors disposed in a first direction and a plurality of second conductors disposed in a second direction different from the first direction, the sensor signal processing circuit comprising:
   a signal supply circuit which, when in operation, supplies a first signal to the plurality of first conductors;
   a first signal detecting circuit connected to the second conductor; and
   a control circuit which, when in operation, performs control of detecting a proximity of an indicator to the sensor by controlling the first signal detecting circuit to detect a change in a capacitance between at least one of the plurality of second conductors and a ground, and performs control of detecting a position indicated by the indicator on the sensor based on a change in a capacitance at a point of intersection formed by one of the plurality of second conductors and one of the plurality of first conductors supplied with the first signal from the signal supply circuit by controlling the signal supply circuit and the first signal detecting circuit based on a result of comparing, with a predetermined value, a detection result based on the change in the capacitance between the one of the plurality of second conductors and the ground detected by the first signal detecting circuit, the detection result being output from the first signal detecting circuit, wherein the control circuit is configured to control the signal supply circuit to start supplying the first signal to the plurality of first conductors based on the result of comparing, with the predetermined value, the detection result output from the first signal detecting circuit based on the change in the capacitance between the at least one of the plurality of second conductors and the ground.

2. The sensor signal processing circuit according to claim 1, wherein the first signal detecting circuit is connected to each of the plurality of second conductors.

3. The sensor signal processing circuit according to claim 2, wherein the control circuit detects the proximity of the indicator by selectively controlling the first signal detecting circuit connected to each of the plurality of second conductors.

4. The sensor signal processing circuit according to claim 2,
   wherein the first signal detecting circuit is one of a plurality of first signal detecting circuits, each of the first signal detecting circuits being connected to a respective one of the second conductors, and
   wherein the control circuit detects the proximity of the indicator by performing control of selecting two or more of the plurality of first signal detecting circuits simultaneously.

5. The sensor signal processing circuit according to claim 1, wherein the control circuit performs control of identifying one of the second conductors detecting the proximity of the indicator from a detection result output from the first signal detecting circuit based on a change in a capacitance between at least one of the plurality of second conductors and the ground, and performs control of detecting the position indicated by the indicator on the sensor based on a change in a capacitance of at least one point of intersection formed by the identified second conductor and the plurality of first conductors supplied with the first signal from the signal supply circuit.

6. The sensor signal processing circuit according to claim 1, further comprising
   a conductor selecting circuit configured to selectively connect each of the plurality of second conductors to the first signal detecting circuit.

7. The sensor signal processing circuit according to claim 6, wherein, in performing control of detecting the proximity of the indicator to the sensor based on a change in a capacitance between at least one of the plurality of second conductors and the ground, the control circuit simultaneously connects two or more of the plurality of second conductors to the first signal detecting circuit by controlling the conductor selecting circuit.

8. The sensor signal processing circuit according to claim 1, further comprising
   a position calculating circuit configured to calculate the position indicated by the indicator on the sensor based on the detection result output from the first signal detecting circuit.

9. The sensor signal processing circuit according to claim 1,
   wherein the control circuit is configured to control the first signal detection circuit to detect the proximity of the indicator during a first detecting period and to detect a proximity of a stylus during a second detecting period, the stylus having a casing in a shape of a pen, and including, in the casing, a signal generating circuit configured to generate a second signal, a driving source configured to drive the signal generating circuit, and an electrode configured to send out the second signal generated by the signal generating circuit, the electrode being disposed in a predetermined position on a pen point side of the casing, and
   the control circuit is configured to substantially simultaneously detect a position indicated by the indicator and a position indicated by the stylus by switching between the first detecting period and the second detecting period on a time-division basis.

10. The sensor signal processing circuit according to claim 9, further comprising
    a second signal detecting circuit configured to be selectively connected to the plurality of first conductors,
    wherein, in response to a transition from the first detecting period to the second detecting period, the control circuit performs control of connecting the second signal detecting circuit to the plurality of first conductors.

11. The sensor signal processing circuit according to claim 10, wherein, in response to a detection of the position indicated by the stylus based on a detection result output from at least one of the first signal detecting circuit and the second signal detecting circuit, the control circuit sets the second detecting period relatively longer than the first detecting period.

12. The sensor signal processing circuit according to claim 10, wherein the control circuit is configured to calculate at least one of the position indicated by the indicator based on a detection result of the first signal detecting circuit and a position indicated by the stylus based on respective detection results of the first signal detecting circuit and the second signal detecting circuit.

13. The sensor signal processing circuit according to claim 9, further comprising
a second signal detecting circuit configured to be selectively connected to the plurality of first conductors,
wherein, in response to a transition to the second detecting period from the first detecting period of detecting the position indicated by the indicator on the sensor based on a change in a capacitance of at least one point of intersection formed by the plurality of second conductors and the plurality of first conductors supplied with the first signal from the signal supply circuit by controlling the signal supply circuit and the first signal detecting circuit, the control circuit performs control of connecting the second signal detecting circuit to the first conductors in place of supplying the first signal from the signal supply circuit to the plurality of first conductors.

14. The sensor signal processing circuit according to claim 9, wherein the casing of the stylus is conductive, and the first signal detecting circuit detects the conductive casing of the stylus as the indicator in the first detecting period.

15. The sensor signal processing circuit according to claim 9, wherein, when the control circuit recognizes that a first detection result of the indicator detected in the first detecting period and a second detection result of the stylus detected in the second detecting period are similar, the control circuit generates a predetermined state flag.

16. The sensor signal processing circuit according to claim 9, wherein, when the control circuit recognizes that a first detection result of the indicator detected in the first detecting period and a second detection result of the stylus detected in the second detecting period are similar, the control circuit processes the second detection result detected in the second detecting period.

17. A position detecting device comprising:
a sensor including:
a plurality of first conductors disposed in a first direction, and
a plurality of second conductors disposed in a second direction different from the first direction; and
a sensor signal processing circuit connected to the sensor, including:
a signal supply circuit which, when in operation, supplies a first signal to the plurality of first conductors,
a first signal detecting circuit connected to the second conductor, and
a control circuit which, when in operation, performs control of detecting a proximity of an indicator to the sensor by controlling the first signal detecting circuit to detect a change in a capacitance between at least one of the plurality of second conductors and a ground, and performs control of detecting a position indicated by the indicator on the sensor based on a change in a capacitance at a point of intersection formed by one of the plurality of second conductors and one of the plurality of first conductor supplied with the first signal from the signal supply circuit by controlling the signal supply circuit and the first signal detecting circuit based on a result of comparing, with a predetermined value, a detection result based on the change in the capacitance between the second conductor and the ground detected by the first signal detecting circuit, the detection result being output from the first signal detecting circuit, wherein the control circuit is configured to control the signal supply circuit to start supplying the first signal to the plurality of first conductors based on the result of comparing, with the predetermined value, the detection result output from the first signal detecting circuit based on the change in the capacitance between the at least one of the plurality of second conductors and the ground.

18. A sensor signal processing method performed by a control circuit included in a sensor signal processing circuit connected to a sensor, the sensor including a plurality of first conductors disposed in a first direction and a plurality of second conductors disposed in a second direction different from the first direction, the sensor signal processing method comprising:
detecting a proximity of an indicator to the sensor by controlling a first signal detecting circuit that is connected to the plurality of second conductors to detect a change in a capacitance between at least one of the plurality of second conductors and a ground;
comparing, with a predetermined value, the change in the capacitance between the at least one the plurality of second conductors and the ground detected by the first signal detecting circuit; and
detecting a position indicated by the indicator on the sensor based on a change in a capacitance at a point of intersection formed by one of the plurality of second conductors and one of the plurality of first conductors supplied with a first signal from a signal supply circuit by controlling the signal supply circuit supplying the first signal to the plurality of first conductors and the first signal detecting circuit based on a result of the comparing, wherein the controlling of the signal supply circuit includes controlling the signal supply circuit to start supplying the first signal to the plurality of first conductors based on the result of comparing, with the predetermined value, the detection result output from the first signal detecting circuit based on the change in the capacitance between the at least one of the plurality of second conductors and the ground.

19. The sensor signal processing method according to claim 18,
wherein the control circuit is configured to control the first signal detection circuit to detect the proximity of the indicator during a first detecting period and to detect a proximity of a stylus during a second detecting period, the stylus having a casing in a shape of a pen, and including, in the casing, a signal generating circuit configured to generate a second signal, a driving source configured to drive the signal generating circuit, and an electrode configured to send out the second signal generated by the signal generating circuit, the electrode being disposed in a predetermined position on a pen point side of the casing, the sensor signal processing method further comprising:
switching between the first detecting period and the second detecting period on a time-division basis, and detecting a position indicated by the indicator and a position indicated by the stylus substantially simultaneously.

* * * * *